US009594163B2

(12) United States Patent
Park et al.

(10) Patent No.: US 9,594,163 B2
(45) Date of Patent: Mar. 14, 2017

(54) SECURITY AND SURVEILLANCE SYSTEM AND METHOD

(71) Applicant: Electronics and Telecommunications Research Institute, Daejeon (KR)

(72) Inventors: Kang-Ho Park, Daejeon (KR); Sung Q Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 348 days.

(21) Appl. No.: 14/223,797

(22) Filed: Mar. 24, 2014

(65) Prior Publication Data
US 2014/0307096 A1 Oct. 16, 2014

(30) Foreign Application Priority Data

Apr. 15, 2013 (KR) .................. 10-2013-0041182
Oct. 15, 2013 (KR) .................. 10-2013-0122862

(51) Int. Cl.
| H04N 7/18 | (2006.01) |
| G01S 15/89 | (2006.01) |
| G01S 15/02 | (2006.01) |
| G08B 19/00 | (2006.01) |
| G08B 13/16 | (2006.01) |

(Continued)

(52) U.S. Cl.
CPC ............ *G01S 15/02* (2013.01); *G01S 15/04* (2013.01); *G08B 13/1672* (2013.01); *G08B 17/04* (2013.01); *G08B 19/00* (2013.01); *H04N 7/18* (2013.01)

(58) Field of Classification Search
None
See application file for complete search history.

(56) References Cited

U.S. PATENT DOCUMENTS 3,681,745 A * 8/1972 Perlman ................ G01S 15/523
342/28
3,838,408 A * 9/1974 McMaster .......... G08B 13/1627
340/501

(Continued)

FOREIGN PATENT DOCUMENTS

CN 1125877 C 10/2003
DE 202010017770 U1 11/2012

(Continued)

*Primary Examiner* — Hung Dang

(57) ABSTRACT

Provided is a security surveillance system and method capable of separately detecting fire and intrusion situations on the basis of a sound field variation, including a sound generating device outputting, into a set security surveillance space, a multi-tone sound wave formed of a linear sum of sine waves having a plurality of frequency components, a sound receiving device obtaining sound field information for each frequency represented as sound pressure and a phase from a sound wave received in the security surveillance space, and a sound field signal processing device storing sound field information for each frequency obtained from the sound receiving device in a preparation mode, comparing the stored sound field information with current sound field information for each frequency output from the sound receiving device in a surveillance mode, and determining occurrence of a security situation.

18 Claims, 20 Drawing Sheets

(51) Int. Cl.
  *G08B 17/04*  (2006.01)
  *G01S 15/04*  (2006.01)

(56) References Cited

U.S. PATENT DOCUMENTS

| | | |
|---|---|---|
| 4,150,415 A | 4/1979 | Fichtner |
| 9,240,113 B2 | 1/2016 | Lee et al. |
| 2009/0184830 A1 | 7/2009 | Watabe et al. |

FOREIGN PATENT DOCUMENTS

| | | |
|---|---|---|
| GB | 2 299 405 A | 10/1996 |
| GB | 2 299 668 A | 10/1996 |
| JP | 10-283577 A | 10/1998 |
| KR | 10-2007-0119593 A | 12/2007 |
| KR | 10-2012-0037855 A | 4/2012 |
| KR | 10-2013-0074437 A | 7/2013 |
| KR | 10-2013-0108033 A | 10/2013 |

\* cited by examiner

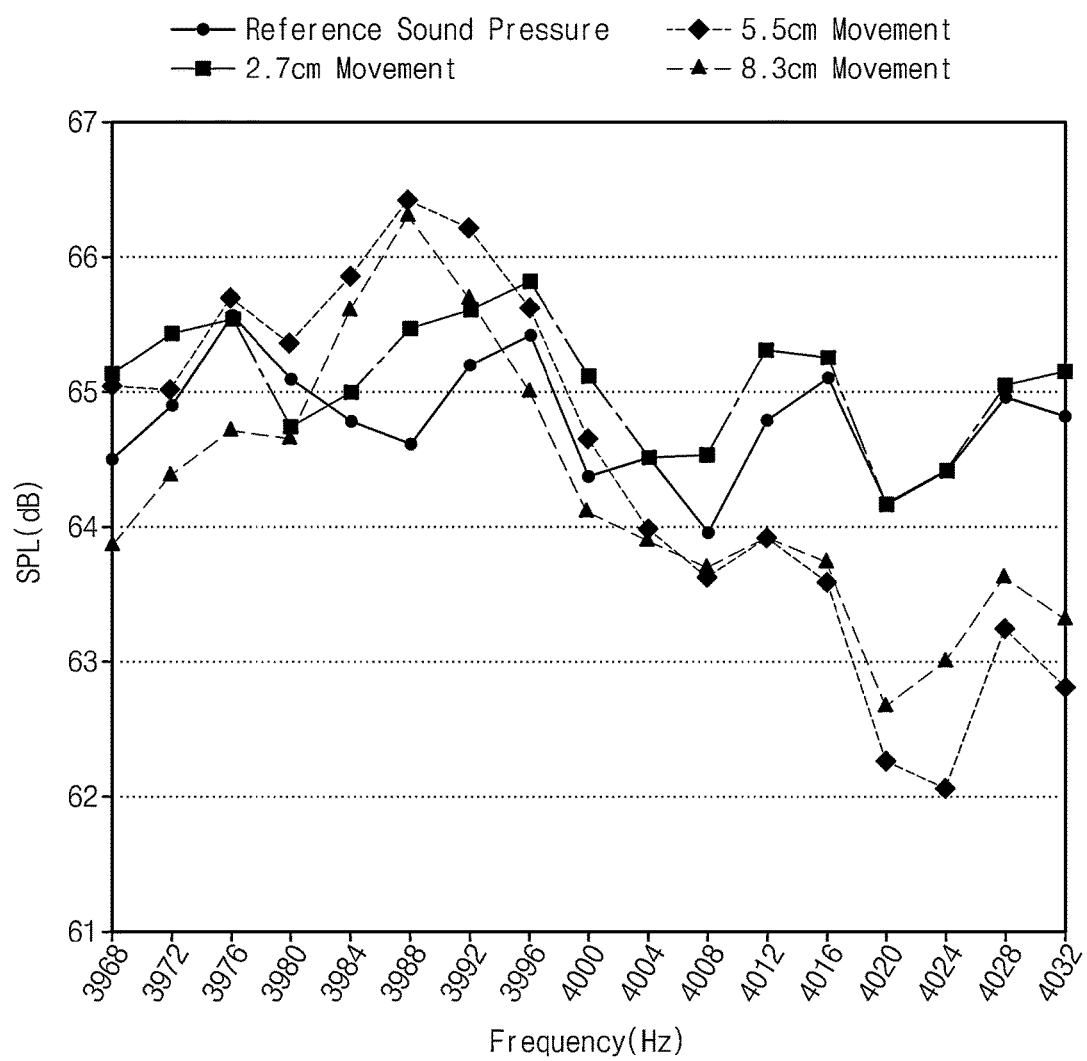

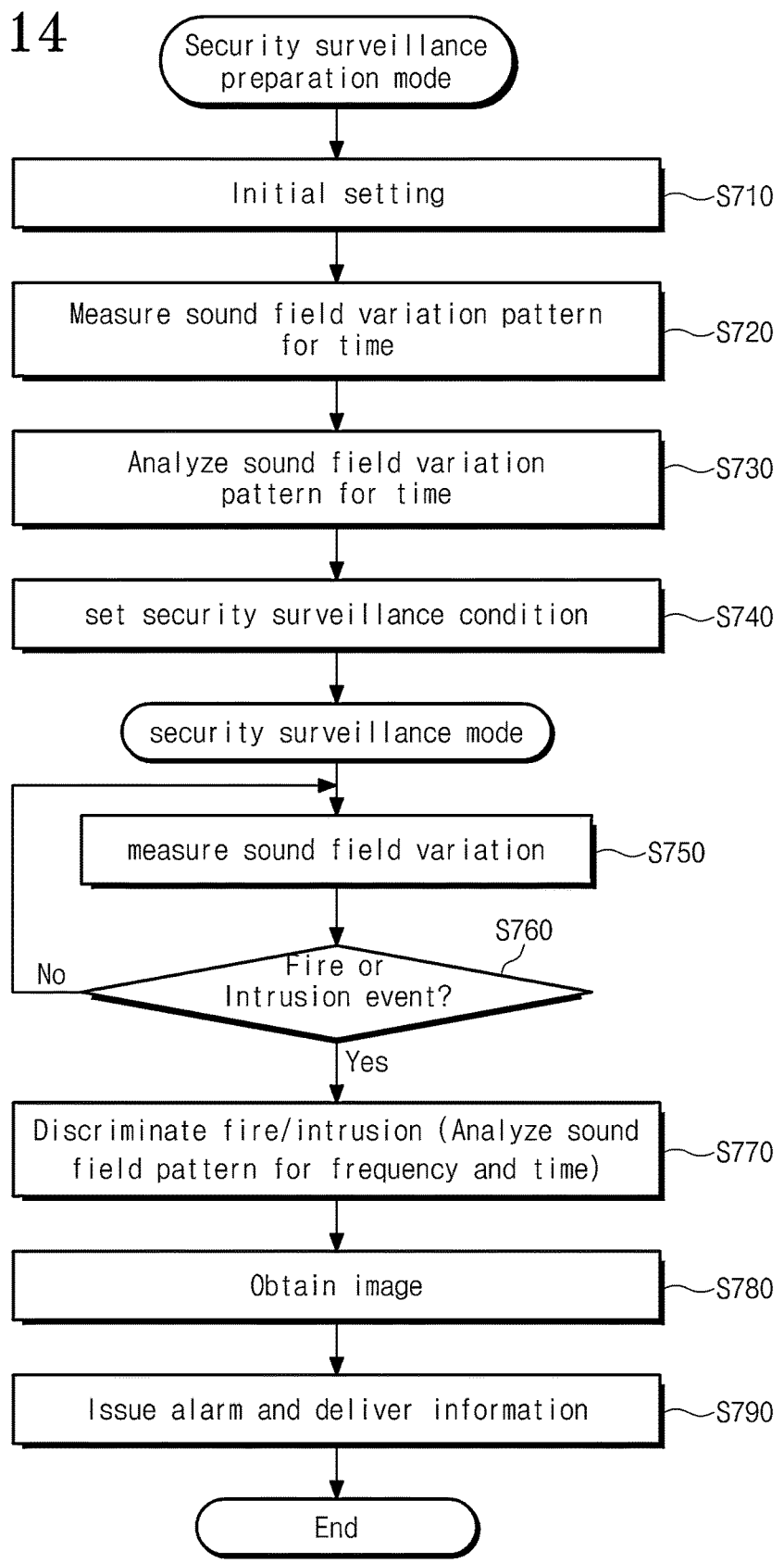

SECURITY AND SURVEILLANCE SYSTEM AND METHOD

CROSS-REFERENCE TO RELATED APPLICATIONS

This U.S. non-provisional patent application claims priority under 35 U.S.C. §119 of Korean Patent Application No. 10-2013-0041182, filed on Apr. 15, 2013 and Korean Patent Application No. 10-2013-0122862, filed on Oct. 15, 2013, the entire contents of which are hereby incorporated by reference.

BACKGROUND OF THE INVENTION

The present invention disclosed herein relates to security and surveillance, and more particularly, to a security surveillance system and method capable of separately detecting fire and intrusion situations on the basis of a sound field variation.

A security sensor used for sensing fire or intrusion situation has been researched for a long time.

A sensor sensing fire may use one of a temperature sensing scheme, a smoke sensing scheme, a gas sensing scheme, and a flame sensing scheme. On the other hand, a sensor for sensing intrusion may use one of a passive infrared (PIR) sensing scheme, an IR sensing scheme, an ultrasonic scheme, a sound sensing scheme, a vibration sensing scheme, and a microwave sensing scheme.

Recently, an image surveillance system using camera imaging information, such as a CCTV, an internet protocol (IP) camera, or a vehicle blackbox is largely used in a security surveillance field.

Typically, an intrusion detector detecting a sound pressure variation to detect intrusion is known. When counting the number of times that a difference between detected sound pressure and reference sound pressure exceeds a predetermined value and determining that the counted number of times is a preset reference number or greater, the intrusion detector generates an output for determining the intrusion. The intrusion detector may detect even intrusion without sound. However, the intrusion detector is required to determine intrusion criterions variably according to spatial or environmental conditions. Furthermore, the intrusion detector does not discriminate intrusion from fire.

In another case, there is a combined fire detector detecting smoke, a flame, and fire. The combined fire detector detects the smoke, flame, and the fire by means of one integrated fire detector. The combined fire detector has a smoke sensing function for preparing for spontaneous combustion together with a flame detecting function for preparing arson.

This combined fire detector may have a low false reporting ratio with respect to various fire situations and detect fire in an early state when it is installed at a location where a flame or smoke is directly detected. However, this combined fire detector does not detect fire well in an early fire state when a temperature or smoke density at a sensor installed location is not high. In addition, when a flame is covered with an object or fire breaks out at a blind spot, the combined fire detector is difficult to detect fire in an early state because of difficulty of detecting a flame.

In another case, a fire surveillance method and system based on a sound field variation may detect a sound field variation inside a fire surveillance space to detect fire in an early state. Here, the sound field variation is caused by a fact that changes in air density and sound wave speed according to a temperature change of surrounding air due to the fire affect sound wave transfer. Although this sound field variation based fire detecting scheme may detect outbreak of fire on the basis of the sound field variation due to the fire, it is difficult to detect a temperature distribution change in detail and quantitatively. Accordingly, it is difficult to exactly discriminate fire from intrusion, wherein they are main causes of the sound field variation.

In another case, there is a security scheme through a sound field pattern analysis. This security scheme detects a sound field variation and detects intrusion based on a sound pressure variation rate with respect to a standard deviation by detecting a deviation and an average of sound pressure. Furthermore, reliability for security surveillance is increased by detecting a pattern of the sound field variation according to a time change or a wavelength change of a sound source.

However, even in this method, due to difficulty of detecting a temperature distribution change in detail and quantitatively, it is still difficult to discriminate fire from intrusion, wherein they are main causes of the sound field variation.

SUMMARY OF THE INVENTION

The present invention provides a security surveillance method and system capable of discriminately detecting security situations of fire and intrusion.

The present invention also provides a security surveillance method and system based on a sound field variation capable of detecting fire and intrusion situations, discriminating them from each other, and providing comprehensive security surveillance.

Embodiments of the present invention provide security surveillance systems including: a sound generating device outputting, into a set security surveillance space, a multi-tone sound wave formed of a linear sum of sine waves having a plurality of frequency components; a sound receiving device obtaining sound field information for each frequency represented as sound pressure and a phase from a sound wave received in the security surveillance space; and a sound field signal processing device storing sound field information for each frequency obtained from the sound receiving device in a preparation mode, comparing the stored sound field information with current sound field information for each frequency output from the sound receiving device in a surveillance mode, and determining occurrence of a security situation, wherein the sound field signal processing device compares a reference sound field information pattern for each frequency with sound field information pattern collected for a predetermined period on occurrence of the security situation, and discriminates whether it is fire occurrence or intrusion occurrence in the security surveillance space.

In some embodiments, the sound field signal processing device may discriminate a fire situation from an intrusion situation by analyzing whether the sound field information pattern is continuously shifted towards a high frequency without changing a shape thereof or the shape of the sound field information pattern is changed in comparing patterns of the sound field information for each frequency.

In other embodiments, after functionally shifting the sound field information pattern for each frequency for a predetermined period towards a high or low frequency, comparing the shifted sound field information pattern with the reference sound field information pattern, and analyzing frequency shift degrees, the sound field signal processing device may determine whether fire occurs by detecting a variation speed of a continuous temperature increase by using the analyzed result, and determine an intrusion situation by detecting an aspect that a temperature change does not occur or irregularly occurs.

In still other embodiments, after functionally shifting the sound field information pattern for each frequency for a predetermined period towards a high or low frequency, comparing the shifted sound field information pattern with the reference sound field information pattern, and deriving indexes representing frequency shift degrees, the sound field signal processing device may analyze orientation and a speed of a temperature change by using the analyzed result, and discriminately determine fire, a temperature change due to a daily temperature range or air-conditioning/heating, and an intrusion situation.

In even other embodiments, the sound field signal processing device may discriminate a fire situation from an intrusion situation by analyzing whether a variation value of sound field in contrast to deviation from a reference sound field for a predetermined period is continuously increased or irregularly changed in the occurrence of the security situation.

In other embodiments of the present invention, security surveillance methods include: outputting, into a set security surveillance space, a multi-tone sound wave formed of a linear sum of sine waves having a plurality of frequency components; obtaining a sound field from the received sound wave in the security surveillance space; storing reference sound field information for a frequency through the obtained sound field in a preparation mode; calculating current sound field information for a frequency in a surveillance mode, comparing the current sound field information for each frequency with the reference sound field information for a frequency to determine occurrence of a security situation; and comparing the reference sound field information pattern for each frequency with sound field information pattern collected for a predetermined period on occurrence of the security situation, and discriminating whether it is fire situation or intrusion situation.

In still other embodiments of the present invention, security surveillance systems include: a sound generating device outputting a sound wave; a sound receiving device obtaining sound field information for each set frequency from a sound wave received from a security surveillance space; a sound field signal processing device storing reference sound field information for a frequency by using the sound field output from the sound receiving device, comparing the reference sound field information with current sound field for a frequency output from the sound receiving device to determine occurrence of a security situation; and an image obtaining unit obtaining an image of the security surveillance space in the occurrence of the security situation, wherein the sound field signal processing device discriminates whether an occurring event is fire or intrusion by comparing and analyzing a pattern of the reference sound field information for a frequency with a pattern of sound field information for a frequency collected for a predetermined period in the occurrence of the security situation.

In even other embodiments of the present invention, vehicle blackbox systems include: a sound generating and receiving device outputting and receiving a sound wave; a sound field signal processing device preparing reference sound field information for a frequency by using sound field obtained from the received sound wave, and comparing the reference sound field for a frequency with current sound field for a frequency obtained in a surveillance mode in a security surveillance car space to determine occurrence of a security situation; and a vehicle blackbox obtaining an image of the security surveillance car space in the occurrence of the security situation, wherein the sound field signal processing device compares and analyzes a pattern of the reference sound field information for a frequency with a pattern of sound field information for a frequency collected for a predetermined period to discriminately determines whether an occurring event is fire or intrusion.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 8 illustrate a sound pressure level change according to an object moving distance inside the security space according to FIG. 4;

FIG. 14 is a flow chart illustrating a security surveillance method according to an embodiment of the present invention;

DETAILED DESCRIPTION OF PREFERRED EMBODIMENTS

Figure 1:
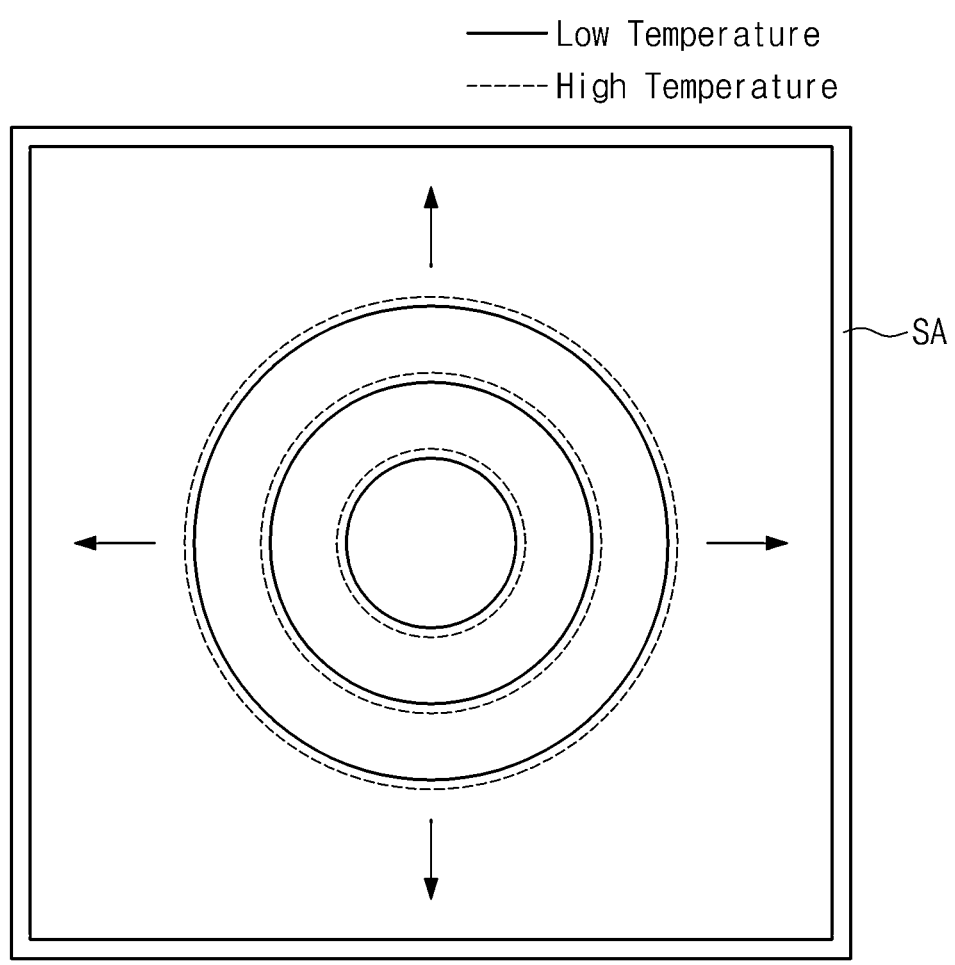
FIG. 1 illustrates a wavelength change of a sound wave according to a temperature change.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings. Like reference numerals refer to like elements throughout. It should be noted that in the description of the present invention, any description that may unnecessarily blur the point of the present invention is omitted.

A procedure which a sound field variation occurs according to a change in a sound wave speed during outbreak of fire inside a security surveillance space may be explained theoretically through FIGS. 1 and 2.

FIG. 1 illustrates a wavelength change of a sound wave according to a temperature change.

During outbreak of fire, a sound wave speed increases according to a temperature increase inside a security surveillance space (SA). Accordingly, a wavelength of a sound wave output from a sound generation device is increased. In FIG. 1, circles of solid lines represent wavelengths of sound waves output at low temperature, and circles of dotted lines represent wavelengths of sound waves output at high temperature.

Accordingly, a sound generation device installed inside the SA detects a sound field of a sound wave differently according to a temperature. Such a sound field variation phenomenon may occur frequently on an acoustic space where a sound wave is frequently echoed. In such a way, when the sound field is detected, fire in a blind spot where a flame or smoke is not observed may be detected.

Typically, the speed v of a sound wave may be expressed as Equation (1) below, and is proportional to temperature T degrees Celsius. Accordingly, although a frequency f is identical, a wavelength λ has properties of increasing in proportional to temperature T of the air according to Equations (2) and (3). When a wavelength differs, a sound pressure distribution of the air also differs inside the SA of the same size. For analyzing this, theoretical analysis conditions are as follows:

$$v = 331.5 + 0.6T \quad (1)$$

$$v = f \cdot \lambda \quad (2)$$

$$\lambda = (331.5 + 0.6T)/f \quad (3)$$

From FIG. 1, it may be known that, when temperature increases, a sound wave speed increases. Accordingly, even for a sound wave having the same frequency, the wavelength thereof becomes long as temperature increases.

Figure 2A:
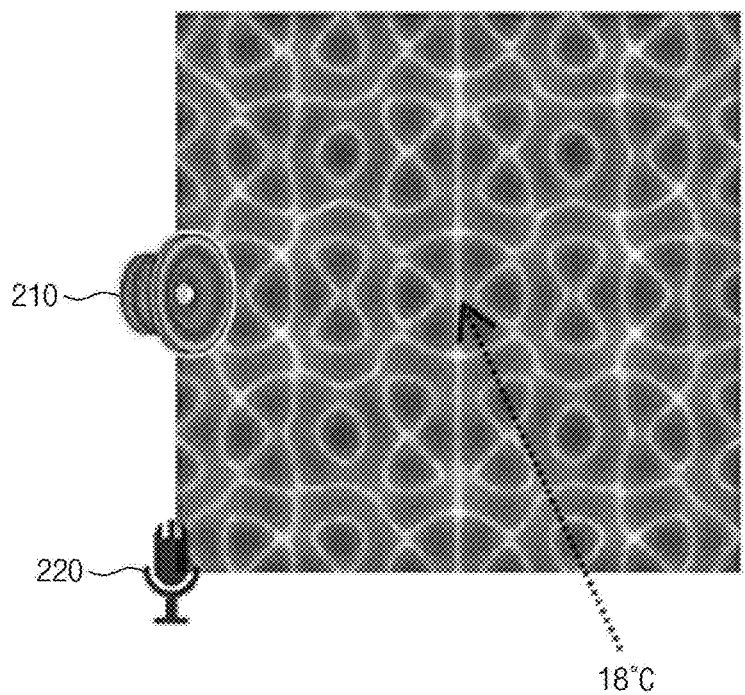
FIGS. 2A and 2B are views for explaining a variational principle for sound according to a temperature change.
Figure 2B:
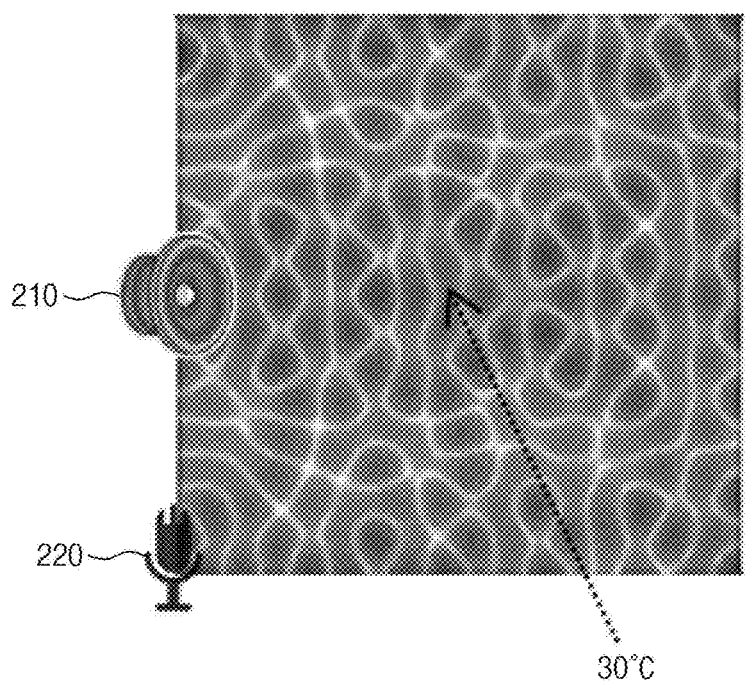

FIGS. 2A and 2B are views for explaining a variational principle for sound according to a temperature change.

When temperature increases (for example, from about 18° C. to about 30° C.) in an entire area due to fire in an SA having an acoustic hard wall, a procedure of a sound field variation according to a sound wave speed change is described.

The size of the acoustic wall existing in the SA in FIGS. 2(a) and 2(b) is 3 m×3 m. FIG. 2A represents a sound pressure level at room temperature (about 18° C.) before outbreak of fire and FIG. 2B represents a sound pressure level in a state where internal temperature is entirely increased to 30° C. due to the fire. This case exemplifies that the sound generation device 210 generates a sound wave of 1 kHz in acceleration of 10 m/s². When the sound wave generated by the sound generation device 210 is propagated inside the SA, a sound pressure level inside the SA may be analyzed by a two dimensional finite element analysis method to be mapped into two dimension space, which results in FIGS. 2A and 2B.

As the temperature increases, the sound field variation phenomenon as FIG. 2B appears all over the audible frequency band or the ultrasound band. The sound field variation according to a temperature change may be detected by using the sound generation device 220 which may be installed inside the SA. The sound wave is not dispersed and extinct on the acoustic hard wall, and reflected and superimposed inside the SA. Accordingly, in such a case, the temperature increase due to the fire may cause a larger change in the sound field and outbreak of the fire may be more easily detected.

Figure 3A:
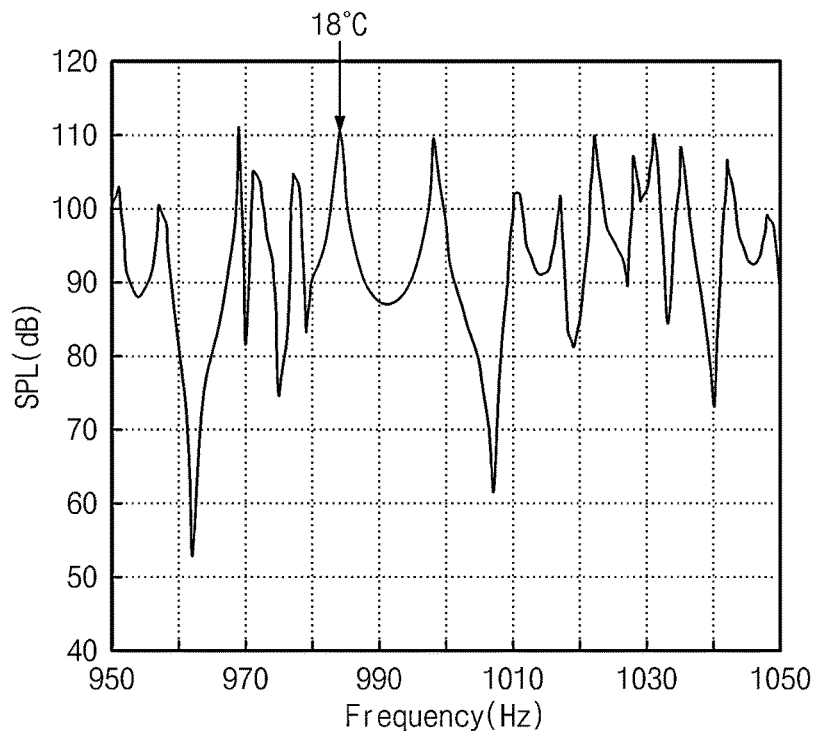
FIGS. 3A and 3B illustrate frequency shifts of a sound pressure level according to a temperature change.
Figure 3B:
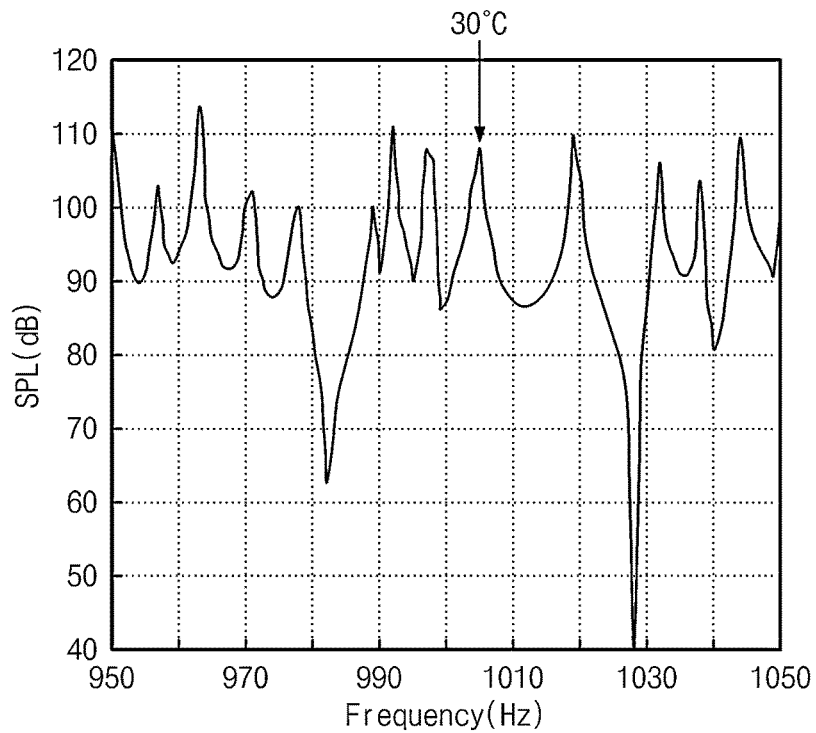

FIGS. 3A and 3B illustrate frequency shifts of a sound pressure level according to a temperature change.

Comparing FIG. 3B with FIG. 3A, it may be confirmed that the sound pressure level is shifted towards a high frequency by a certain amount due to a temperature increase (for example, from about 18° C. to about 30° C.)

In FIGS. 3A and 3B, a horizontal axis represents a frequency in a Hz unit and a vertical axis represents a sound pressure level (SPL) in a dB unit.

Graphs of FIGS. 3A and 3B are spectral curves of the SPL for a frequency measured by using the sound receiving device 220, which may be installed inside the SA, and show the SPL is shifted towards a high frequency due to an internal temperature increase.

According to FIG. 1 and Equation (1), as internal air temperature increases, the sound wave speed becomes increased and accordingly a wavelength of the sound wave having the same frequency becomes proportionally increased.

Since the size of the SA is fixed, when the temperature increases, the wavelength of the sound wave is necessary to be constant in order for a sound receiving device at the same location to have the same sound pressure level. Accordingly, a sound pressure level pattern is shifted towards a high frequency without changing a shape thereof.

At this time, a change value δf may be simply expressed as Equation (4), and a speed change δv of a sound wave is proportional to the temperature change δT in Equation (1). Therefore, it may be obtained that the frequency change δf is proportional to the sound wave frequency as Equation (5) and the temperature change.

When temperature increases from room temperature (about 18° C.) to about 19° C., a frequency shifted value may be about 1.75 Hz at about 1 kHz acoustic frequency, about 3.5 Hz at 2 kHz, and about 7 Hz at 4 kHz.

As shown in FIGS. 3A and 3B, when the temperature increases from room temperature (about 18° C.) to about 30° C., it may be seen that a frequency is shifted by about 21 Hz at 1 kHz acoustic frequency towards a high frequency. An air temperature change due to a real fire is not simplified as an entire temperature increase, and local temperature around the fire and the entire temperature change complicatedly. However, since typically a degree that a sound pressure pattern is shifted towards a high frequency due to a temperature increase is proportional to a temperature change, knowing the degree of shift allows temperature change of interior air to be monitored. For example, when a center frequency of a multi-tone frequency is 4 kHz and a frequency interval us 4 Hz, a temperature change amount δT is expressed as Equation (6) and corresponds to about 0.57° C. at room temperature (T=about 18° C.):

$$\delta f = f \cdot \delta v / v \quad (4)$$

$$\delta f = 0.6 \cdot f \cdot \delta T / v \quad (5)$$

$$\delta T = \delta f / f \cdot (331.5 + 0.6T) / 0.6 \quad (6)$$

Figure 4:
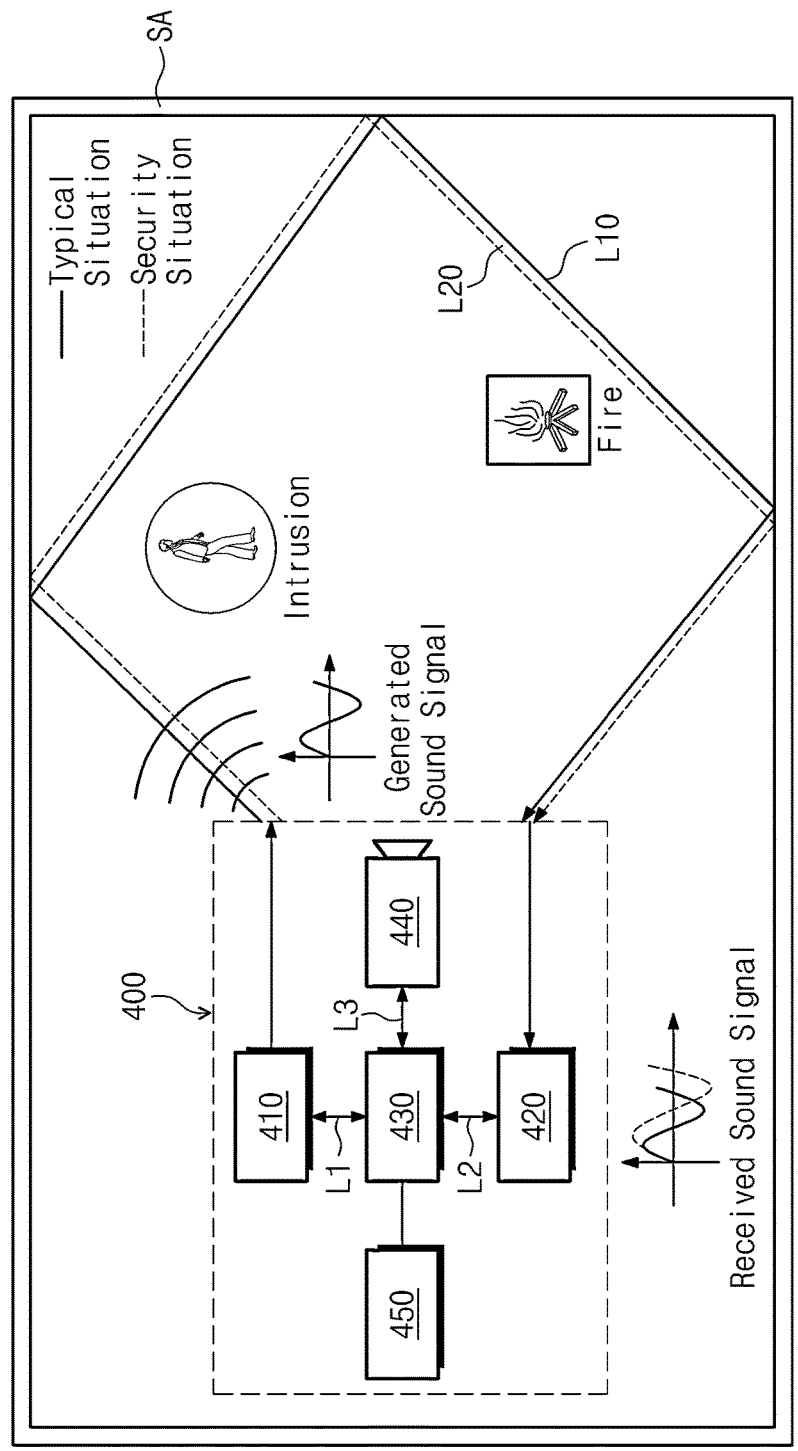
FIG. 4 is a block diagram illustrating a security surveillance apparatus according to a conceptual embodiment of the present invention.

FIG. 4 is a block diagram illustrating a security surveillance apparatus according to a conceptual embodiment of the present invention.

Referring to FIG. 4, the security surveillance apparatus includes a sound generation device 410, a sound receiving device 420, and a sound field signal processing device 430.

The sound generation device 410 outputs a sound wave according to an input voltage in an SA. Here, the sound wave output from the sound generation device 410 may be a multi-tone sound wave formed of a linear sum of an audible frequency of about 20 to 20 k Hz and sine waves having a plurality of frequency components in an ultrasonic wave region.

A sound pressure level of the sound generation device 410 may be set to an optimal magnitude which allows the sound generation device 410 to be driven with rate power and a sound field variation to be detected according to security situation.

The sound receiving device 420 receives the sound wave in the SA and obtains the sound pressure level from the received sound wave. Here, the sound receiving device 420 may include a frequency conversion filter which converts the received sound wave into that in a frequency domain.

The sound signal processing device 430 is a device that determines an intrusion or fire situation by using a sound field variation in the SA and may be implemented through a processor, such as a PC or a digital signal processor (DSP). A sound field value may be represented as a sound pressure and a phase, and the sound pressure and the phase are usable individually or in a combined type. However, in the present embodiment, the sound pressure is suggested as an example and a sound pressure level, which is a magnitude of the sound pressure, is used as a target of signal processing. Here, the sound pressure level may be typically represented as a logarithmic function, and a value that the sound receiving device 420 obtains by measuring sound pressure in the SA becomes the sound pressure level. Here, the sound pressure in the SA is a pressure of a sound wave which is output from the sound generation device 410 and spreads over the SA.

Accordingly, the sound field signal processing device 430 calculates reference sound pressure information (magnitude of the reference sound pressure (Amp=20 log P)) or a phase (Ph=ang (P)) of the reference sound pressure. In this case, in order to prevent the sound pressure (P) from changing due to an environmental change, such as gradual temperature/humidity changes, the sound field signal processing device 430 calculates an average and deviations of the sound pressure information for each frequency and measures a sound field variation pattern for a time period. The sound field signal processing device 430 analyzes the measured sound field variation pattern for a time period to set an initialization time period and a determination reference value of a security situation.

In addition, the sound field signal processing device 430 calculates current sound pressure information (magnitude of current sound pressure (Amp=20 log P')) or a phase (Ph=ang (P')) of the current sound pressure by using an acoustic transfer function (P') in a surveillance mode and compares the reference sound pressure information and the current sound pressure information to determine occurrence of security situation of fire and intrusion.

In detail, the sound field signal processing device 430 compares a signal value (Signal) and a reference deviation (Noise) (hereinafter referred to as a sound pressure variation to reference deviation rate (SNR)). When the SNR is determined as a reference value or greater, it is determined a security situation occurs.

Here, the reference deviation may be a maximum value of deviations of reference sound pressure information for each frequency and the signal value may be an absolute value (20 log P'−20 log P) of a difference value between an average of reference sound pressure information for each frequency and an average of current sound pressure information for each frequency.

In this case, the sound field signal processing device 430 may re-set the determination reference value with the pre-determined initialization time period in order to prevent an alarm from being issued due to a change of sound pressure (P) caused by gradual changes of temperature and humidity of air. Such a re-setting may be performed by measuring an average and deviation of sound pressure information for each frequency in the initialization time period interval in a surveillance situation.

On the other hand, since a sound field may be changed by intrusion as well as fire, it is difficult to discriminate a fire situation from an intrusion situation only by measuring the sound field variation. Accordingly, the sound field signal processing device 430 detects a sound field variation pattern for each frequency. The sound field signal processing device 430 may compare the detected acoustic change pattern for each frequency with a pre-stored reference acoustic field change pattern for each frequency to determine whether the sound field variation is caused by fire or intrusion.

In such a way, discrimination fire from intrusion inside an SA is performed on the basis of a sound field variation. The sound field variation is detected by using a multi-tone sound source formed of a linear sum of sine waves. Here, when a sound field variation aspect according to time and frequency shift characteristics of a sound pressure pattern is measured, whether it is a fire situation or an intrusion situation is determined FIG. 5 illustrates a sound pressure level variation for a frequency according to a temperature change inside the SA of FIG. 4.

Figure 5:
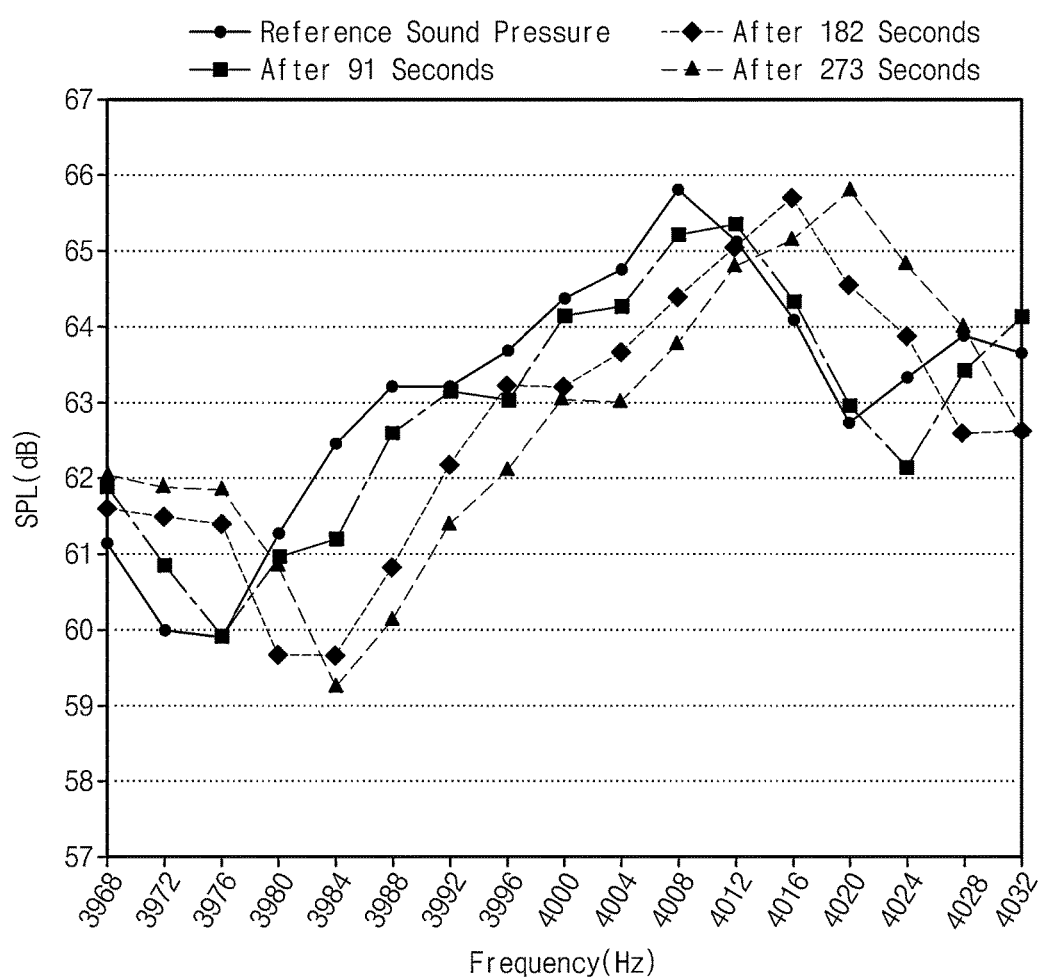
FIG. 5 illustrates a sound pressure level change for each frequency according to a temperature change inside a security space.

In FIG. 5, a horizontal axis denotes a frequency in Hz, and a vertical axis denotes a sound pressure level in dB.

In order to imitate a fire situation, an electric heater is operated inside an SA. According to heating time variation due to operation of the electric heater, it may be known that sound pressure levels for a frequency are discriminately measured as the graph of FIG. 5. That is, as shown in FIG. 5, according to an increase of the internal temperature, the sound pressure level is continuously shifted towards a high frequency without changing much a pattern type thereof. Here, 17 multi-tone sound sources having the center frequency of 4 kHz and an equidistant interval of 4 Hz are used for obtaining a result of FIG. 5.

FIGS. 6A to 6D illustrate frequency shift degrees for a time period according to FIG. 5.

In FIGS. 6A to 6D, a horizontal axis denote a frequency shift, and a vertical axis indicate a discrepancy index (D-index). Here, a minimum unit of the frequency shift i along the horizontal axis is 4 Hz. The frequency shift i has a value in the range of $-4 \leq i \leq 4$.

With a temperature change, a sound pressure pattern is shifted towards a high frequency or a low frequency by multiples of i, which is a frequency interval of the multi-tones, and absolute values of differences between sound pressure levels for each frequency of the multi-tones are summed. When the summed absolute values are represented as a function of the frequency shift, how much the frequency shift occurs may be compared.

Here, since sound pressure data of a multi-tone maximum frequency in case of the left shift and a multi-tone minimum frequency in case of the right shift are not obtained, a circularly shift method, which moves a value at the end to a value at the head, may be used for convenience. When the frequency shift (i) is 3(3×4=12 Hz) or greater, the D-index is not exact due to this circularly shift method. If the spectrum shifts without the significant change of the shape, the absolute value of the difference of sound pressure levels for each frequency appears to be minimum for a certain frequency shift.

Typically, this value may be defined as a discrepancy index of two sound field patterns according to the frequency shift, and a value obtained by inverse-transforming this value or a value subtracting this value from a maximum discrepancy value may be defined as a similarity index (S-index).

Methods for defining the similarity index may be various, but it is an index that represents how much two sound pressure level patterns are commonly similar.

Figure 6A:
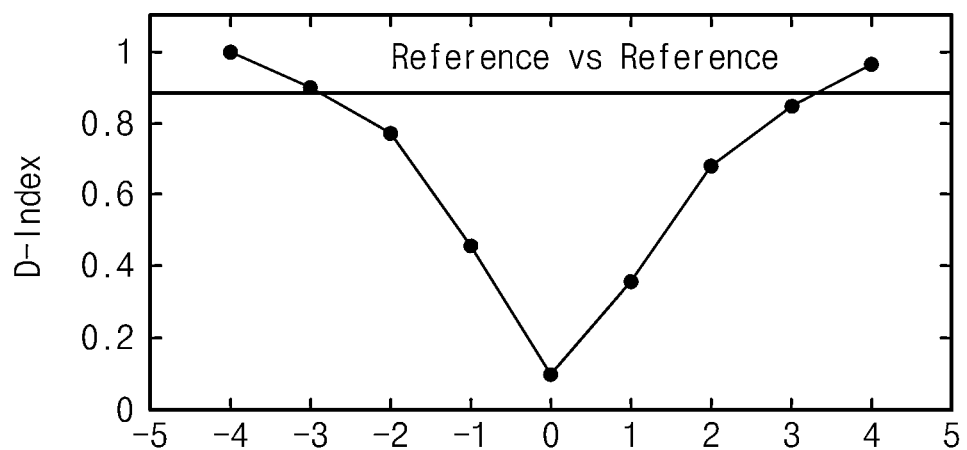
FIGS. 6A to 6D illustrate frequency shift degrees for a time period according to FIG. 5.

Initially, since sound level patterns are identical, the discrepancy index has a minimum value. However, as a frequency shifts to a high frequency or a low frequency, the discrepancy index becomes greater and is vertically symmetrical as shown in FIG. 6A.

Figure 6B:
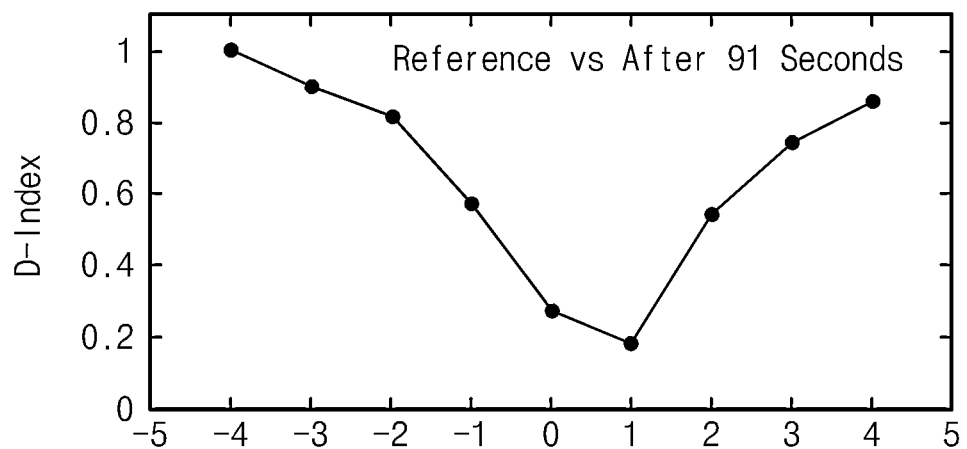

When the interior temperature of the SA increases, the sound pressure level pattern is shifted to a high frequency. When the shift is performed by 4 Hz, which is a one step (i=1) of a gap of the multi-tone frequency component, a minimum value is formed as shown in FIG. 6B.

Figure 6C:
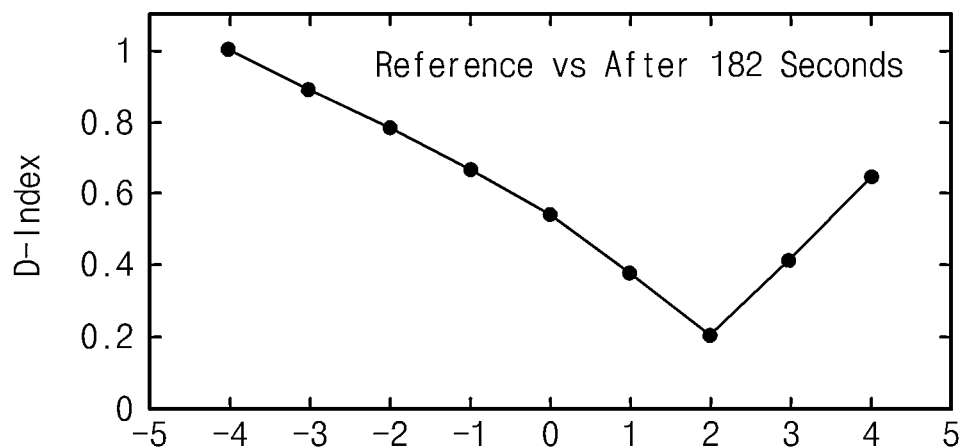

Furthermore, when the time passes and the interior temperature is further increased, it is confirmed that a minimum value of formed as shown in FIG. 6C, when the shift is performed by 8 Hz, which is two steps (i=2) of a gap of the multi-tone frequency component.

Figure 6D:
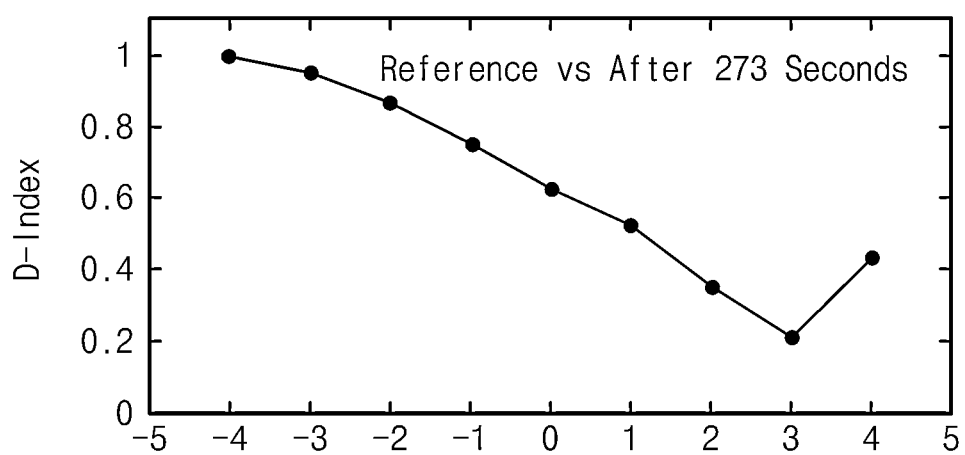
Figure 7A:
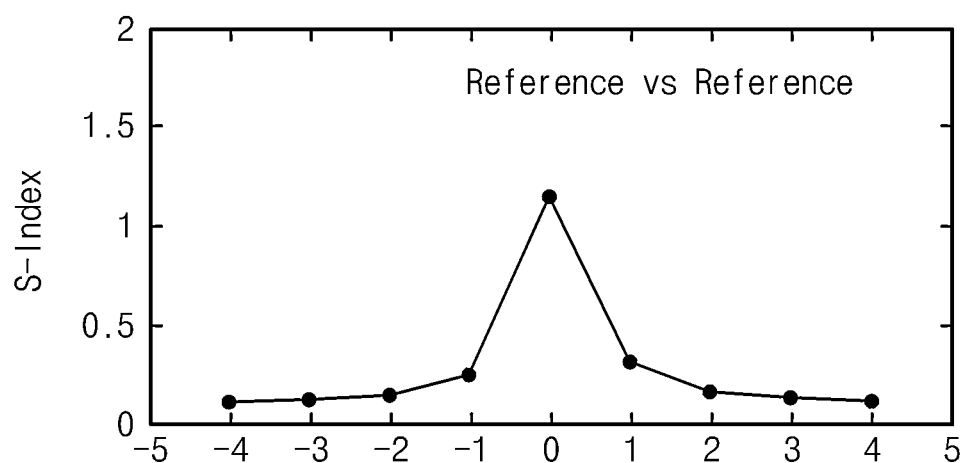
FIGS. 7A to 7D are comparison graphs illustrating normalized frequency shift degrees according to FIG. 6.
Figure 7B:
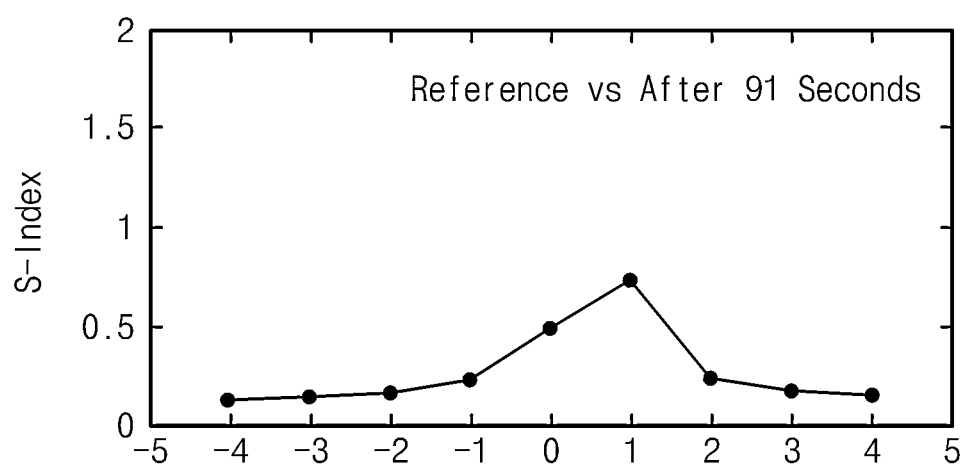
Figure 7C:
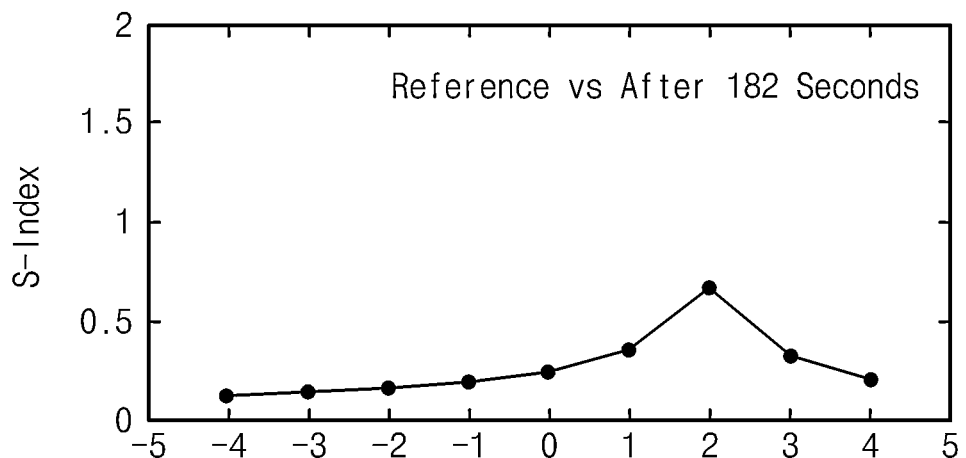
Figure 7D:
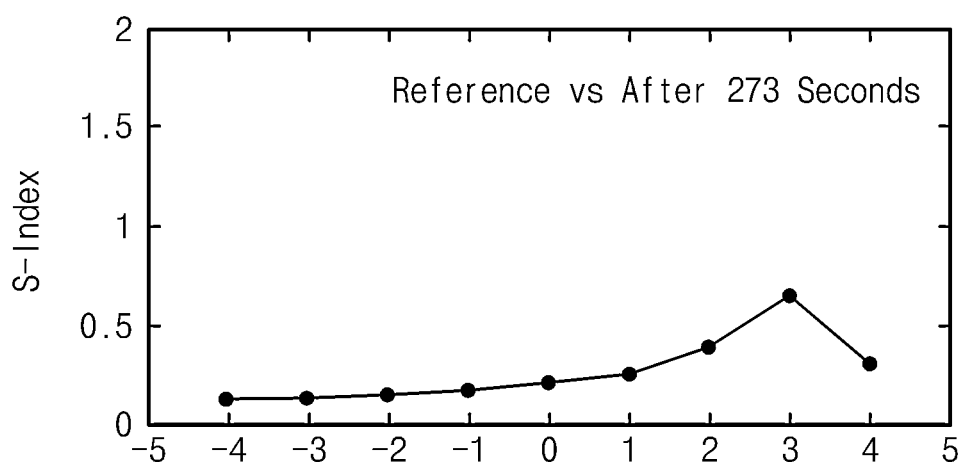
Figure 9A:
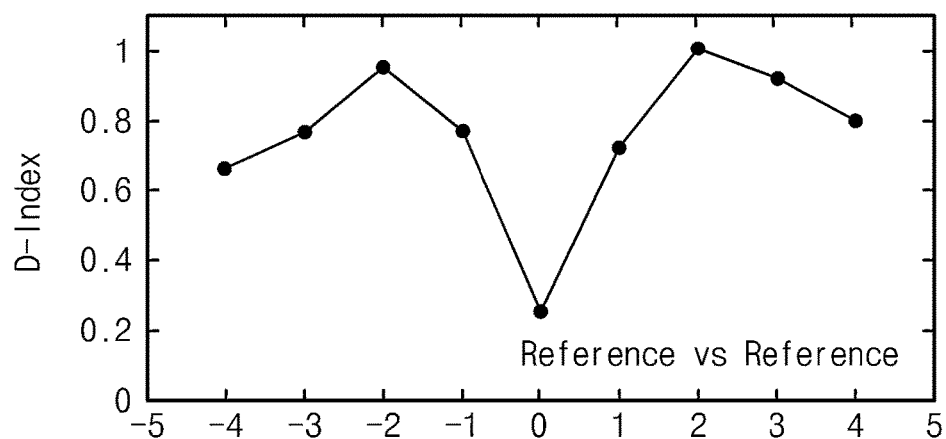
FIGS. 9A to 9D illustrate frequency shift degrees for a moving distance according to FIG. 8.
Figure 9B:
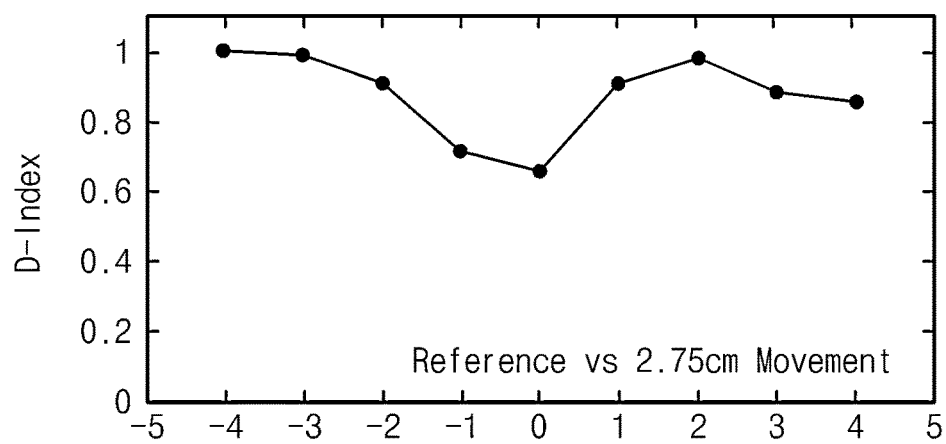
Figure 9C:
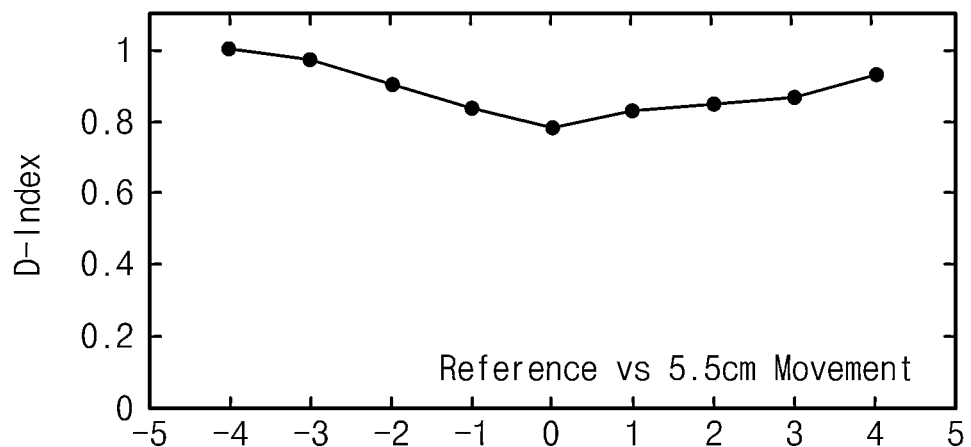
Figure 9D:
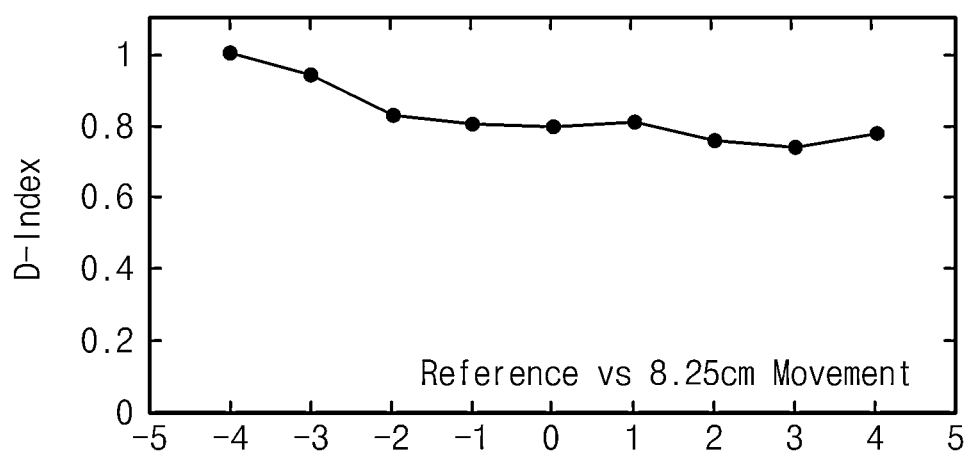
Figure 10A:
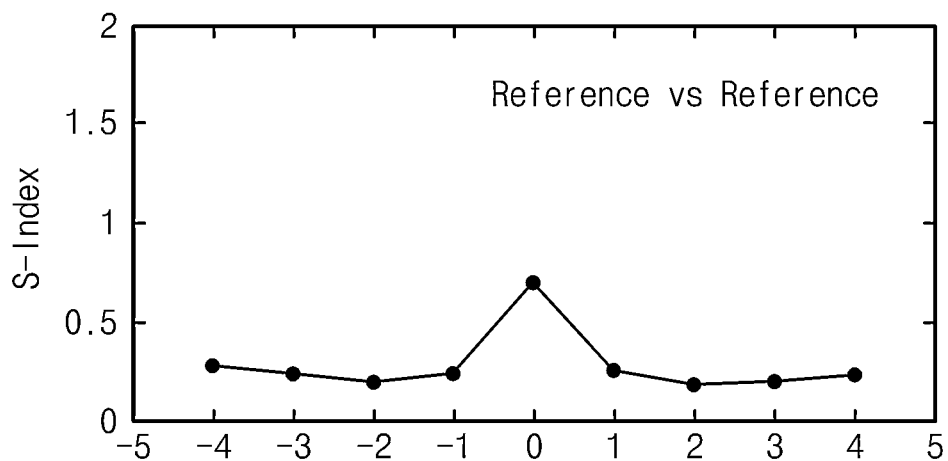
FIGS. 10A to 10D are comparison graphs illustrating normalized frequency shift degrees according to FIGS. 9A to 9D.
Figure 10B:
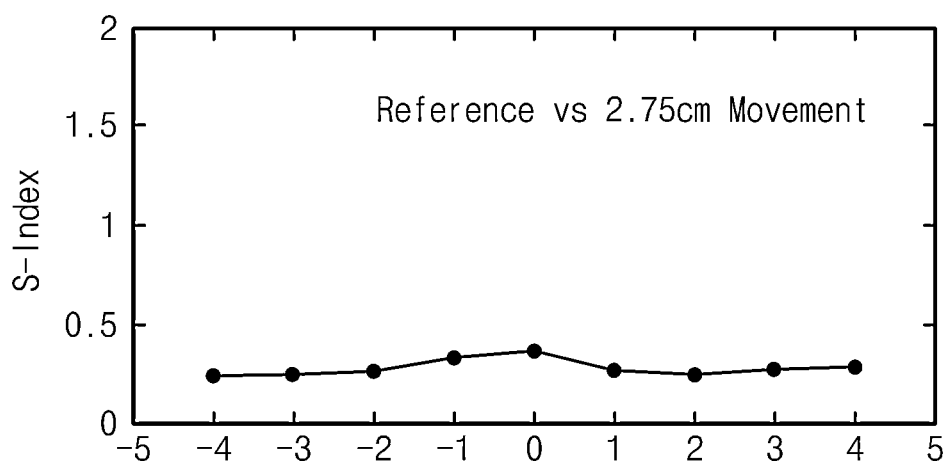
Figure 10C:
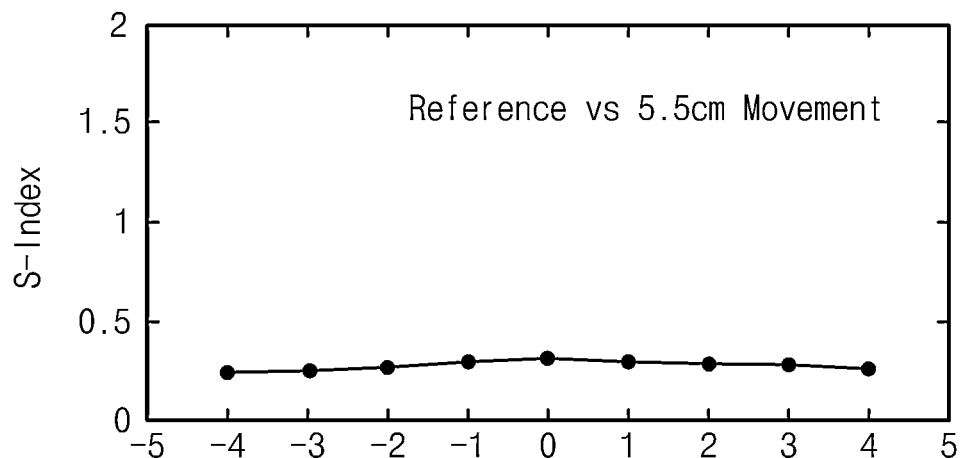
Figure 10D:
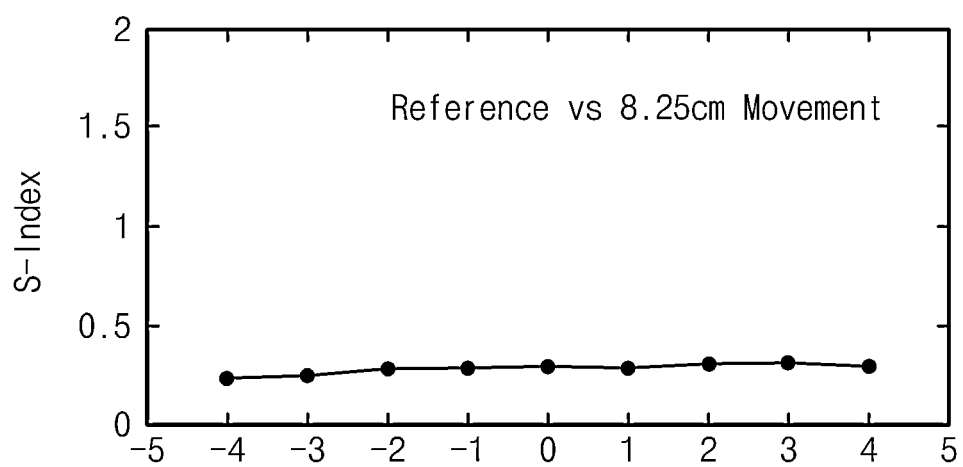

When the time passes and the interior temperature is increased maximally, it is confirmed that a minimum value of formed as shown in FIG. 6D, when the shift is performed by 12 Hz, which is three steps (i=3) of a gap of the multi-tone frequency component.

FIGS. 7A to 7D illustrate comparison results of normalized frequency shift degrees in terms of S-index according to FIGS. 6A to 6D.

In FIGS. 7A to 7D, a horizontal axis denotes a frequency shift, and a vertical axis denotes a similarity index. Here, the frequency shift i of a horizontal axis is a value in the range of −4≤i≤4, and a minimum unit of i is 4 Hz. The similarity index may be obtained by inversing the discrepancy index. It is better to have the similarity index constant in order to use it as a coefficient for calculating an index, which represents a frequency shift degree. Accordingly, the index for the frequency shift may be designated to correspond to frequency shift in actual spectrum, and the index may be designated to be constant as Equation (7) below by summing the similarity indexes corresponding to each multi-tone frequency:

$$\Sigma_{-4\leq i\leq 4} S_i = 2.5 \tag{7}$$

FIG. 8 illustrates a sound pressure level change according to moving distance of an object inside the SA according to FIG. 4.

In FIG. 8, a horizontal axis denotes a frequency in Hz, and a vertical axis denotes a sound pressure level in dB.

In order to imitate an intrusion situation, a dummy is slowly moved inside the SA. That is, a dummy moving device is installed inside the SA in order to discriminate a fire situation from an intrusion situation. FIG. 8 illustrates respective sound pressure patterns when the dummy is moved by 2.75, 5.5, and 8.25 cm. The sound pressure level of moving by 2.75 cm is a little similar to that of a reference sound pressure level, but, in cases of moving 5.5 cm and 8.25 cm, it is confirmed that the pattern shapes are considerably changed. Typically, in case of intrusion, reflection and refraction aspects are complicatedly changed according to a position of an intruder, other than a fire case. Accordingly, even if the intruder slightly moves, the sound pressure pattern is not similar but considerably changed and the change becomes very irregular.

FIGS. 9A to 9D illustrates a frequency shift degree of D-index for moving distance according to FIG. 8. FIGS. 10A to 10D illustrates normalized frequency shift degrees of S-index for comparison according to FIGS. 9A to 9D.

It is confirmed through FIGS. 9A to 9D how the discrepancy index is changed when the discrepancy index according to moving distance of the dummy is represented as a function of frequency shift (−4≤i≤4). In addition, When the similarity index obtained by inversing the discrepancy index is represented as a function of frequency shift (−4≤i≤4), resulting graphs of FIGS. 10A to 10D are obtained.

In FIGS. 9, and 10A to 10D, the discrepancy index and the similarity index calculated in case of intrusion case are shown in contrast to those of a fire case. It can be known that the intrusion case considerably differs from the fire case. That is, it appears an aspect that frequency shift is hardly occur or irregularly occurs, not an aspect that frequency shift is continuously increased.

Figure 11A:
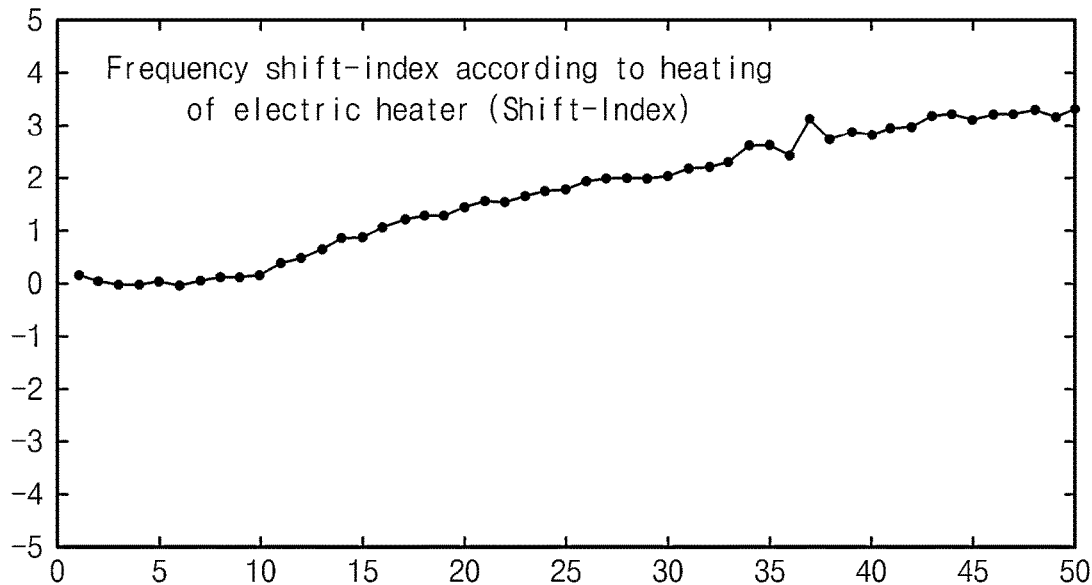
FIGS. 11A and 11B illustrate frequency shift indexes according to FIGS. 7A to 7D and FIGS. 10A and 10B.
Figure 11B:
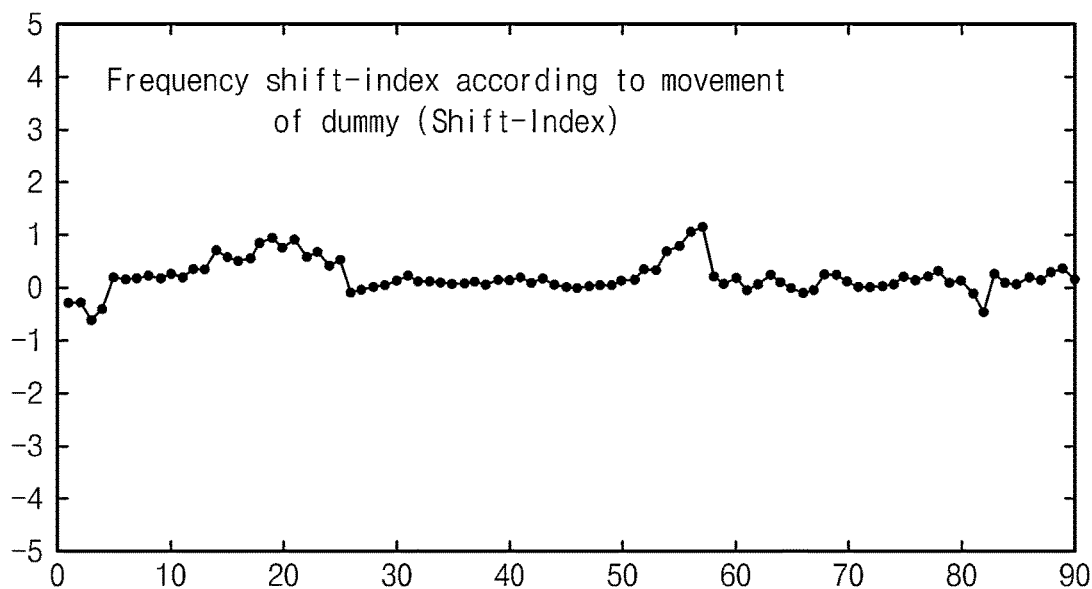

FIGS. 11A and 11B illustrate frequency shift indexes according to FIG. 7A to FIG. 10D.

In FIGS. 11A and 11B, similarity indexes obtained respectively from FIGS. 7A to 7D and FIGS. 10A to 10D are used as coefficient factors for deriving indexes representing frequency shift degrees. The frequency shift indexes according to heating time and moving distance are shown in FIGS. 11A and 11B.

FIG. 11A represents a frequency shift degree according to heating time of an electric heater in a fire situation, and FIG. 11B represents a frequency shift degree according to movement of a dummy in an intrusion situation.

FIG. 11A, which shows the fire situation, is a result obtained through measuring a sound field 50 times in a seven second interval for 5:50 seconds. Moreover, FIG. 11B, which shows the intrusion situation, is a result obtained through measuring a sound field 90 times while moving the dummy in a three second interval by 5.5 mm for 4:40 seconds. Here, the dummy is finally moved to 49.5 cm.

There may be various methods of defining the frequency shift index, and, as an embodiment, a scheme for multiplying a frequency shift value by the similarity index and summing the multiplied results. That is, the frequency shift index (Shift_index) may be defined as equation (8):

$$\text{Shift\_index} = \Sigma_{-4\leq i\leq 4} i \cdot S_i \tag{8}$$

As shown in FIG. 11A, in the fire situation, the frequency shift index may gradually increased. In this gradual increase of temperature case, in consideration of a speed of the increase, it may be determined whether a temperature increase/decrease of air due to heating and cooling or abrupt and continuous temperature increase due to outbreak of fire.

As shown in FIG. 11B, it is observed that, in the intrusion situation, the frequency shift is hardly occurs or irregularly occurs. Analyzing such a frequency shift pattern, whether it is a fire situation or an intrusion situation may be determined FIGS. 12A and 12B illustrate a sound pressure variation rate to reference deviation (SNR) when an SA is heated by using an electric heater.

Figure 12A:
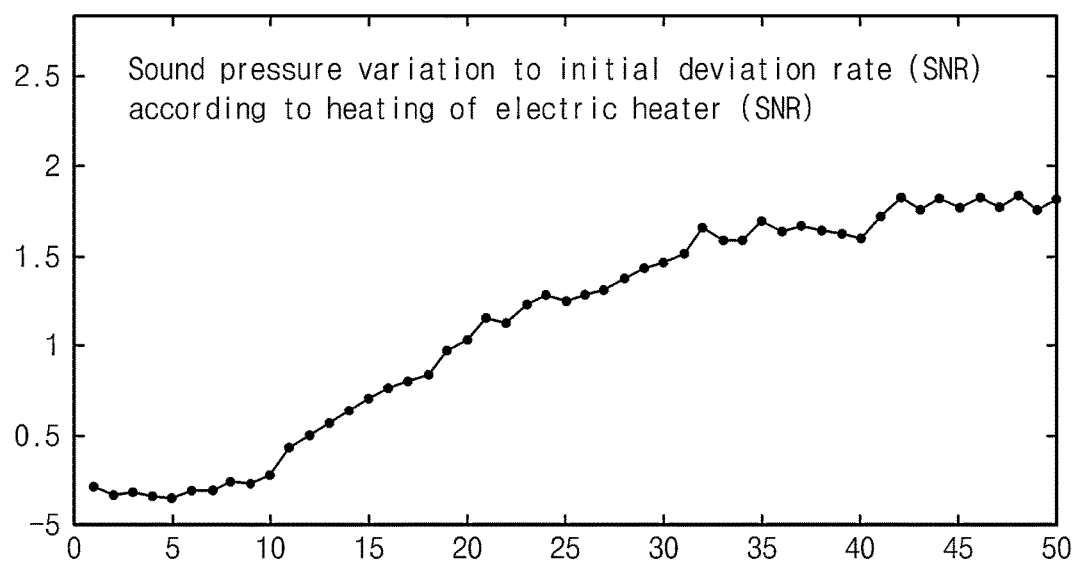
FIGS. 12A and 12B are comparison graphs illustrating sound pressure variation rates (SNR) according to FIG. 11.

FIG. 12A represents the (SNR) when the SA is heated by using the electric heater.

Figure 12B:
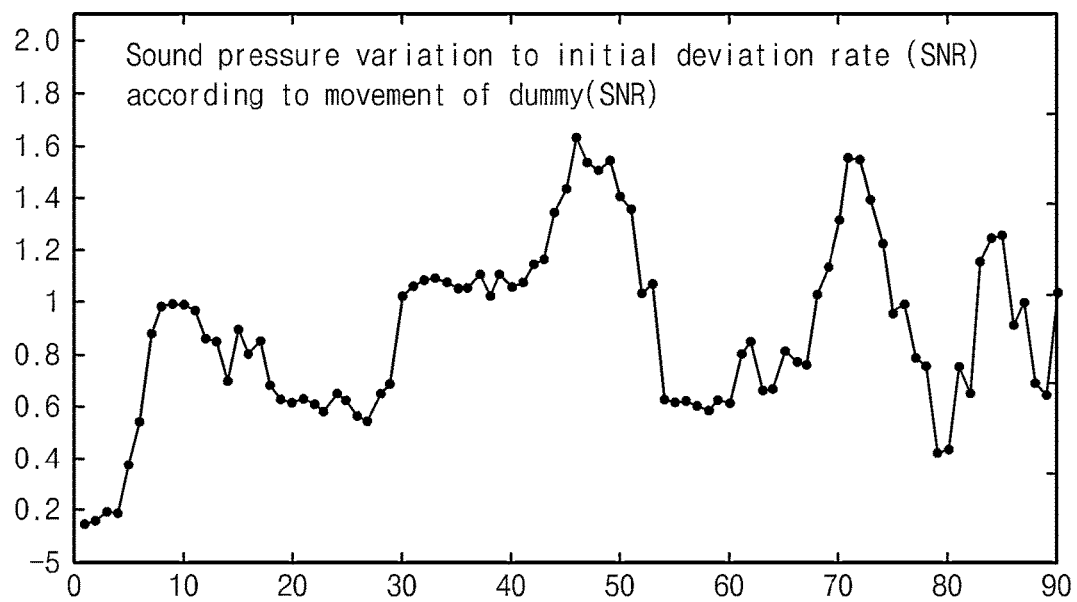

FIG. 12B illustrates the SNR when the dummy is moved.

Comparing FIGS. 12A with 12B, it may be known that initial SNR patterns appear differently from each other in the fire and intrusion situations. That is, the SNR is gradually increased in the fire situation, whereas it fluctuates in the intrusion situation.

In order to analyze these aspects further clearly and quantitatively, it is necessary to derive a variation speed of the SNR or the index (Shift_index) representing a frequency shift degree according to a time. When the derived results are represented graphically or averages of the variation speeds are compared quantitatively with each other, it may be easily determined whether it is a fire situation or an intrusion situation. Beside the above-described scheme, the method of deriving the index representing the frequency shift degree may employ various equations representing correlations between sound field patterns for a frequency, and the Shift_index may be simply defined as the frequency shift value itself giving the maximum correlation function value, and the present invention does not limit the method thereto.

Figure 13A:
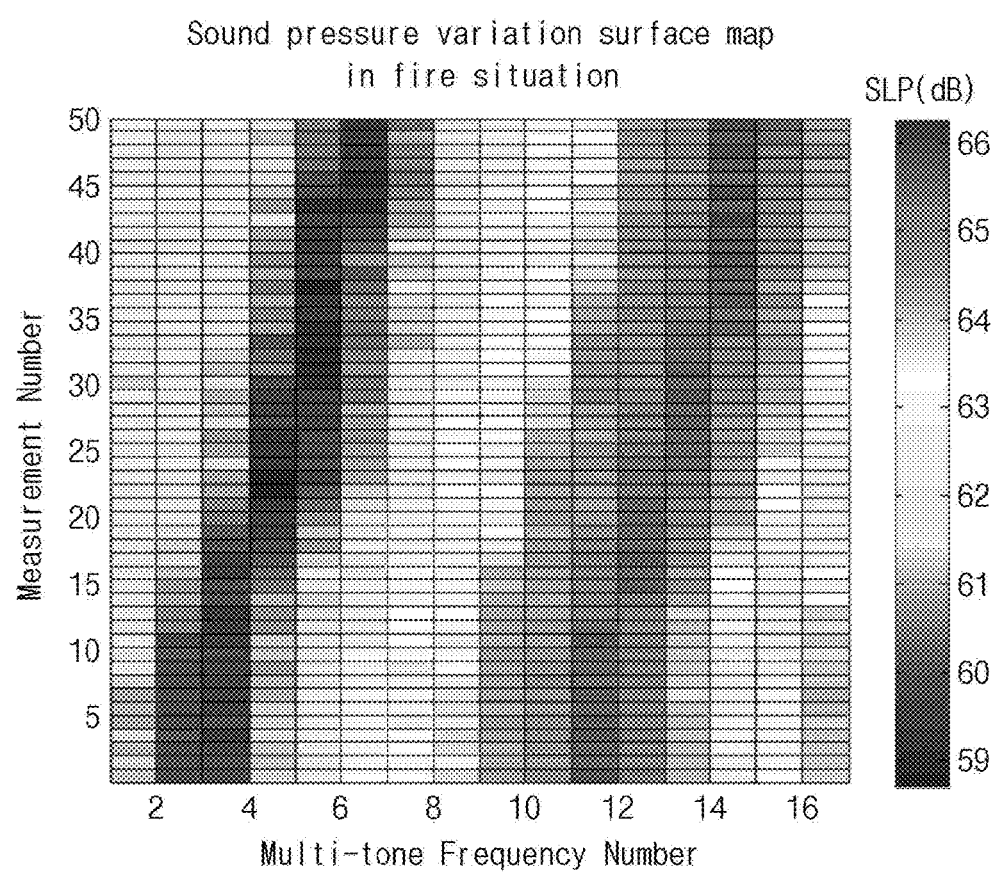
FIGS. 13A and 13B illustrate surface maps of sound pressure levels for each frequency of a multi-tone in the fire and intrusion situations according to FIGS. 11A and 11B.
Figure 13B:
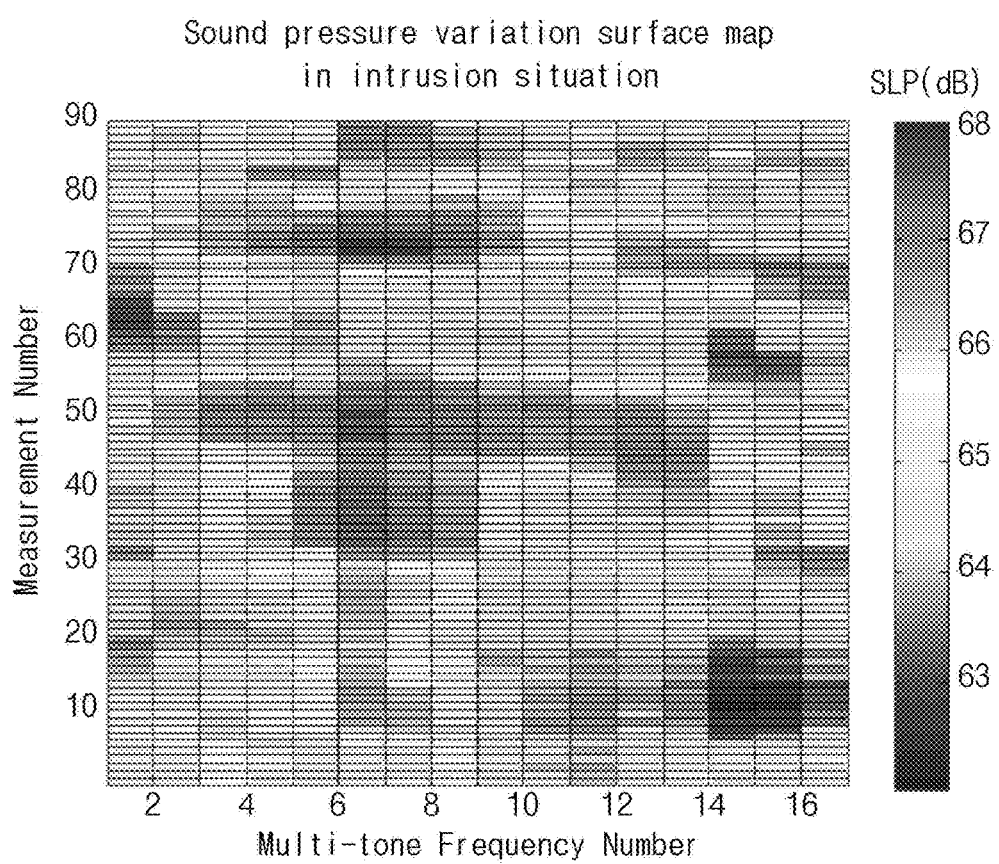

In order to clearly show variation of the sound pressure pattern according to a time, surface maps of the sound pressure patterns are shown in FIGS. 13A and 13B In FIGS. 13A and 13B, the horizontal axis denotes each frequency component of multi-tones and the vertical axis denotes the number of measurements according to a time change. Colors of pixels in each coordinate represent sound pressure levels (SPLs). In a fire case like FIG. 13A, as a heating time of an electronic heater increases, air temperature also increases. Then an SPL pattern has a shape constant but continuously moving towards a high frequency. On the other hand, in the intrusion case like FIG. 13B, the SPL pattern changes irregularly and complicatedly without orientation according to movement of the dummy. By analyzing this change, fire or intrusion may be discriminated even in a real SA.

Since a sound field variation is very slow, which is caused by a temperature change due to a heater and cooler, a daily temperature range, or a sunshine amount, it is discriminated from the intrusion situation. However, there may be special cases that the sound field is abruptly changed by a temperature difference due to a huge daily temperature range, or a large sunshine amount. In such a case, when a measured SNR exceeds a reference SNR set for determining whether a security situation occurs within a predetermined time period, it is incorrectly determined as the security situation, even though it is not the fire or intrusion situation.

In case where the temperature is lowered by operating an air-conditioner, when it is confirmed that a sound pressure pattern shifts towards a low frequency direction through a sound field pattern analysis for a frequency, it is easily discriminated from the intrusion or fire situation. Although a situation due to a rapid temperature increase of air is hardly discriminated from the fire situation, it is easy to discriminate from the intrusion situation.

In a practical application to a security system, it may be set to deliver security information by separately discriminating an air-conditioning situation as well as the intrusion and fire situations. Moreover, in case of the fire, it is necessary to consider that there may be malfunctions by a temperature increase due to huge daily temperature range or a large sunshine amount.

In case of fire, the sound field is continuously changed by a temperature increase, and the sound pressure pattern is continuously shifted towards a high frequency. However, a temperature increase due to the daily temperature range or the sunshine amount is typically slow, compared to the fire, and an increase, a hold-up, and a decrease in temperate are repeated. Accordingly, by monitoring the sound field pattern variation for a predetermined time, it may be determined whether the temperature increase is caused by the fire or the temperature change.

Returning to FIG. 4 again, when the sound field signal processing device 430 discriminately determines the fire or intrusion situation, the security surveillance system 400 according to an embodiment of the present invention may further a camera module 440 for obtaining image information for the fire or intrusion to store or transmit the image information to a destination.

In addition, the sound field signal processing device 430 may receive captured images related to the fire or intrusion, which are transmitted from the camera module 440, and transmit the images through a communication interface 450. Since the communication interface 450 may be connected to a wired/wireless communication network, the captured images may be appeared on each smart device, such as a mobile phone, a smart phone, or a tablet PC. Moreover, the communication interface 450 may be connected to a fire station server or a police station server to transmit the captured images and a unique ID of the security surveillance system 400, under a control of the sound field signal processing device 430.

As described above, a sound field change detection based security surveillance system according to an embodiment of the present invention may discriminate a security dangerous situation in an initial fire or intrusion situation and issue alarm according to the fire or intrusion situation. Furthermore, when interworking with a camera module, such as a CCTV, the security surveillance system may store the captured images related to the fire or intrusion situation or transmit the capture images to a set destination. Here, the destination may be a wireless vehicle remote controller of a specific person, a smart device such as a mobile phone, a security office server, a security service company server, a fire station server, or a police station server. According to the sound field change detection based security surveillance system, rapid and effective security surveillance service can be implemented.

FIG. 14 is a flow chart for a security surveillance method according to an embodiment of the present invention.

The method shown in FIG. 14 may be implemented by executing an operation of the sound field signal processing device 430 of FIG. 4, and discriminately detects the fire and intrusion situations on the basis of the sound pressure detection.

Referring to FIG. 14, a security surveillance method according to an embodiment of the present invention is largely divided into a preparation mode and a surveillance mode.

The preparation mode may include an initial setting step (S710), a sound field variation pattern for a time measuring step (S720), a sound field variation pattern for a time analyzing step (S730), and a security surveillance condition setting step (S740).

The surveillance mode may include a sound field measuring step (S750), a security situation occurring determination step (S760), a fire/intrusion discrimination through the sound field variation pattern analysis step (S770), an image obtaining step (S780), and an alarm issuing and information delivering step (S790).

In the initial setting step (S710), the sound generating device 410 is operated and outputs a sound wave in an SA according to a constant input voltage. In addition, the sound receiving device 420 is operated and receives the sound wave in the SA. The sound field signal processing device 430 calculates an average and deviations of reference sound file information (sound pressure, phase) for a frequency provided from the sound receiving device 420. The calculated information is stored in an internal DRAM or a flash memory.

In the sound field variation pattern for a time measuring step (S720), the sound field signal processing device 430 calculates an average and deviations of sound pressure information according a time change for a frequency, in order to measure the sound field variation pattern for a time, and compares the calculated results with the average and deviations of the reference sound pressure information for a frequency.

In the sound field variation pattern for a frequency analyzing step (S730), the sound field signal processing device 430 analyzes the measured sound field variation pattern for a time and then store the sound pressure variation rate to a reference deviation (SNR), which is a sound field variation index for a time.

In the security surveillance condition setting step (S740), the sound field signal processing device 430 sets an initialization time period and a reference value for determining occurrence of a security situation with reference to the stored SNR.

In the sound field variation measuring step (S750) under the security surveillance mode, the sound field signal processing device 430 calculates an average and deviations of current sound pressure for a frequency. In this case, the sound field signal processing device 430 may re-set the reference value for determining outbreak of a security situation in the initialization time period.

In the security situation, such as the fire or intrusion, occurring determination step (S760), the sound field signal processing device 430 compares an average and deviations of current sound pressure information for a frequency with the average and deviations of the reference sound pressure information to determine whether the security situation occurs. In detail, when an average value of the SNR is equal to or greater than a reference value for determining occurrence of the security situation, the sound field signal processing device 430 determines that the security situation of fire or intrusion occurs.

In the fire/intrusion discrimination through the sound field variation pattern analysis step (S770), when it is determined that the security situation occurs, the sound field signal processing device 430 analyzes sound field variation patterns for a predetermined time period at a reference time point and on the occurrence of the security situation. Here, aspects of a frequency shift degree of the sound pressure level pattern and the SNR according to a time are analyzed to determine whether a cause of the occurrence of the security situation is fire or intrusion.

In the image obtaining step (S780), when it is confirmed that the fire or intrusion occurs, in order to verify it, the camera module is operated by a control of the sound field signal processing device 430 to capture images and store image information.

In the alarm issuing and information delivering step (S790), the sound field signal processing device 430 may issue a fire or intrusion alarm sound or deliver alarm to a wireless vehicle remote device. In addition, images captured through the camera module may be transmitted to a mobile phone, a smart phone, or a server in a security office, a security service company, or a police station through a wired/wireless communication network. For a typical vehicle without a network function, a wireless remote device, such as a remote controller, may be used for operating or releasing an alarm function.

Each step in FIG. 14 may be omitted or have another step supplemented as necessary.

Figure 15:
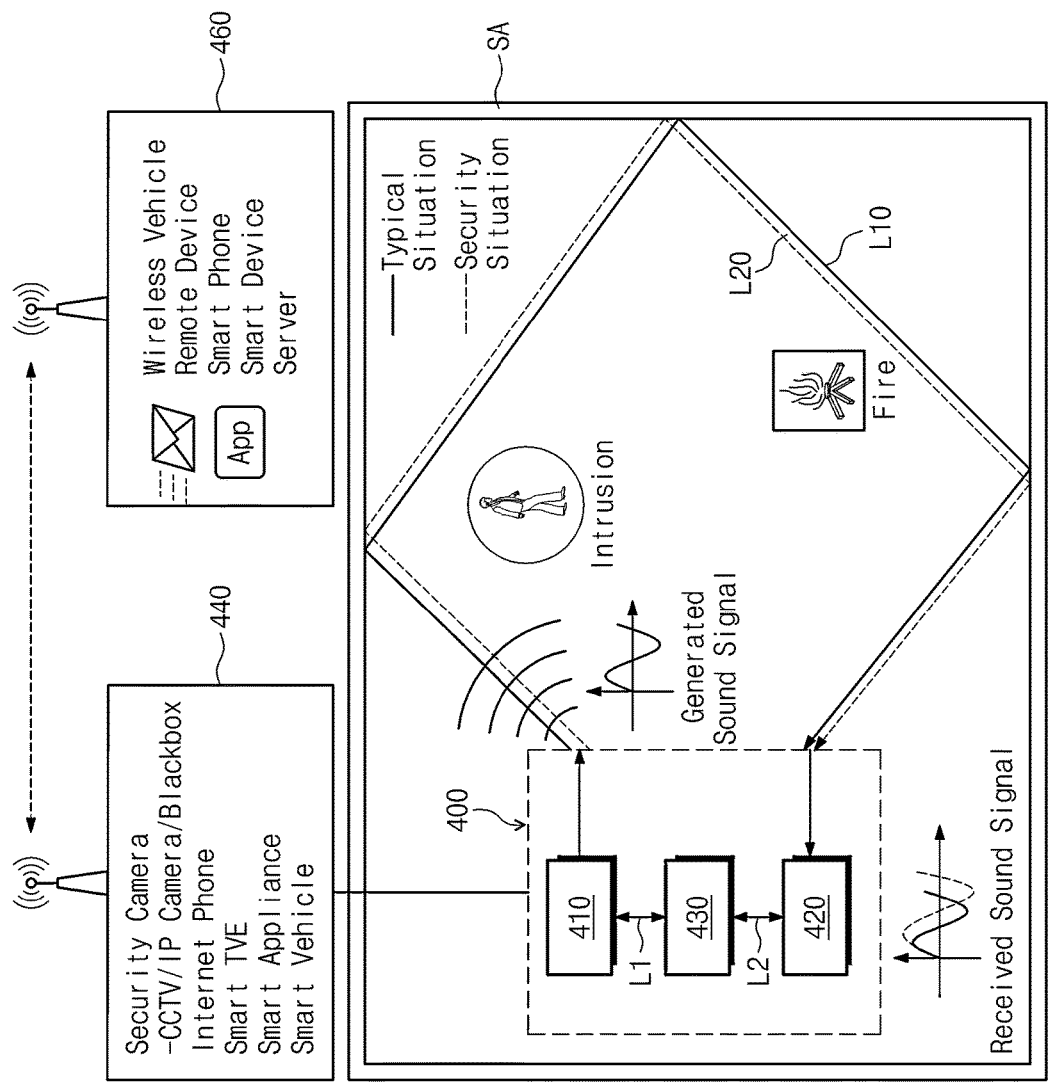
FIG. 15 illustrates an application example of an embodiment of the present invention which is applied to a security service system.

FIG. 15 illustrates an application example of the present invention which is applied to a security service system.

Referring to FIG. 15, a function for discriminating and detecting occurrence of fire or intrusion inside the SA on the basis of a sound field may be mounted on a vehicle blackbox, a security camera connected to a wired/wireless network, an internet phone, a smart TV, a safe, or a smart appliance including an interphone, or smart vehicle. On occurrence of the security situation of intrusion or fire, a text message or an image message may be provided to a mobile phone or a smart device of a user through wired/wireless communication, as shown in FIG. 15.

That is, FIG. 15 represents a concept of a security service system using a security surveillance system for discriminating and detecting fire from intrusion on the basis of a sound field variation. The security surveillance system basically includes the security surveillance system 400, and may further include the security camera 440 and a security information receiver.

The security information receiver 460 may be a wireless vehicle remote device, a smart phone, a smart device, or a server.

The security surveillance system 400 may be installed inside the SA.

The security surveillance system 400 detects an intrusion situation without a blind spot in case where an external intruder intrudes through a boundary area, an entrance, a window, the ceiling, the bottom, or a wall of the SA. On the other hand, in case where the security surveillance system 400 is applied to the inside of a vehicle, when an intruder intrudes into the vehicle through a vehicle door or by breaking a window, the security surveillance system 400 may detect the intrusion situation without a blind spot.

Even in case of fire occurring from various causes, such as, overheating or catching fire of an electric heater, a short circuit, overheating of cooking tools, overheating of appliances, gas leaks, fire spread, or arson, the security surveillance system 400 may detect a fire situation in an early state by detecting a temperature distribution change inside the SA.

The security service system of FIG. 15 may be embedded in a security camera, such as a CCTV or a vehicle blackbox to be formed in an integrated type. Moreover, the security surveillance system 400 may be manufactured in an externally mounted type to be connected to the security camera in a wired/wireless manner.

As various use examples, the security surveillance system 400 may be connected to an internet phone and used in an integrated type or in an externally mounted type manner. The security surveillance system 400 may be embedded or externally mounted in smart appliances including various smart devices, for example, a smart phone, a smart TV, a smart vehicle, or an interphone.

In such a way, a security surveillance system for discriminating and detecting fire and intrusion situations does not require a hardware change of an existing internet phone, or smart device. That is, an interactive use may be available by extending a related algorithm in an internal processor.

Security information detected according to an embodiment of the present invention may be transmitted to various smart devices connected to a network as multimedia information, such as texts or images. Furthermore, when a user of a smart phone or a smart device connects to a related security system in an App type, various security-related services may be possibly provided.

A surveillance system according to embodiments of the present invention has effects capable of handling outbreaks of fire and intrusion properly to the situation by providing the surveillance system which discriminates fire from intrusion on the basis of a sound field variation.

Furthermore, a comprehensive security surveillance system can be provided which has high reliability and reduced errors of malfunctions and not working by providing a sound field variation based security surveillance system configured in a complementary manner with existing fire sensing sensor and intrusion sensing sensor.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A security surveillance system comprising:
   a sound generating device configured to output, into a set security surveillance space, a multi-tone sound wave having a plurality of frequency components respectively having a plurality of frequencies;
   a sound receiving device configured to obtain sound field information for each frequency of the plurality of frequencies, each sound field information including information on a sound pressure and a phase of the corresponding frequency, from a sound wave received in the security surveillance space; and
   a sound field signal processing device configured to store sound field information for each frequency obtained from the sound receiving device in a preparation mode, to compare the stored sound field information with current sound field information for each frequency obtained from the sound receiving device in a surveillance mode, and to determine occurrence of a security situation,
   wherein the sound field signal processing device compares a reference sound field information pattern for each frequency with sound field information pattern collected for a predetermined period on occurrence of the security situation, and discriminates whether it is fire occurrence or intrusion occurrence in the security surveillance space, and
   wherein, after functionally shifting the sound field information pattern for each frequency for a predetermined period towards a high or low frequency, comparing the shifted sound field information pattern with the reference sound field information pattern, and analyzing frequency shift degrees, the sound field signal processing device determines whether fire occurs by detecting a variation speed of a continuous temperature increase by using the analyzed result, and determines an intrusion situation by detecting an aspect that a temperature change does not occur or irregularly occurs.

2. The security surveillance system of claim 1, wherein the sound field signal processing device discriminates a fire situation from an intrusion situation by analyzing whether the sound field information pattern is continuously shifted towards a high frequency without changing a shape thereof or the shape of the sound field information pattern is changed in comparing patterns of the sound field information for each frequency.

3. The security surveillance system of claim 1, wherein, after functionally shifting the sound field information pattern for each frequency for a predetermined period towards a high or low frequency, comparing the shifted sound field information pattern with the reference sound field information pattern, and deriving indexes representing frequency shift degrees, the sound field signal processing device analyzes orientation and a speed of a temperature change by using the analyzed result, and discriminately determines fire, a temperature change due to a daily temperature range or air-conditioning/heating, and an intrusion situation.

4. The security surveillance system of claim 1, wherein the sound field signal processing device discriminates a fire situation from an intrusion situation by analyzing whether a variation value of sound field in contrast to deviation from a reference sound field for a predetermined period is continuously increased or irregularly changed in the occurrence of the security situation.

5. The security surveillance system of claim 1, wherein the security surveillance system discriminately detects the fire and intrusion situations by interworking with one or more sensors selected from among a passive infrared (IR) sensor, an IR sensor, an ultrasonic sensor, a sound detecting sensor, a vibration detecting sensor, a microwave sensor, a temperature sensor, a smoke sensor, a gas sensor, and a flame detecting type fire detecting sensor.

6. The security surveillance system of claim 1, further comprising a camera module storing image information and performing image capturing for verifying a situation in a case of occurrence of the fire or intrusion situation.

7. The security surveillance system of claim 1, wherein the security surveillance system is manufactured in an integrated type or an externally mounted type to interact with a smart appliance including a security camera having a network function, an interne phone, a smart TV, a smart vehicle, a safe, or an interphone.

8. The security surveillance system of claim 1, where the security surveillance system is implemented by installing software without addition of hardware to an interacting device in a time of interaction.

9. The security surveillance system of claim 8, wherein the security surveillance system provides security information remotely controlled or obtained when an App type program related to a smart phone or a smart device of a user is executed.

10. A security surveillance method comprising:
    outputting, into a set security surveillance space, a multi-tone sound wave having a plurality of frequency components respectively having a plurality of frequencies;
    obtaining a sound field from the received sound wave in the security surveillance space;
    storing reference sound field information for each frequency of the plurality of frequencies through the obtained sound field in a preparation mode;
    calculating current sound field information for each frequency in a surveillance mode, comparing the current sound field information for each frequency with the reference sound field information for each frequency to determine occurrence of a security situation; and
    comparing the reference sound field information pattern for each frequency with sound field information pattern collected for a predetermined period on occurrence of the security situation, and discriminating whether it is fire situation or intrusion situation, wherein the discriminating the fire situation from the intrusion situation is performed by, after functionally shifting the sound field information pattern for each frequency for a predetermined period towards a high or low frequency, comparing the shifted sound field information pattern with the reference sound field information pattern, and analyzing frequency shift degrees, the orientation of the shift, and a speed of a continuous temperature increase by using the analyzed result.

11. The security surveillance method of claim 10, wherein the discriminating the fire situation from the intrusion situation is performed by analyzing whether the sound field information pattern is continuously shifted towards a high frequency without changing a shape thereof or the shape of the sound field information pattern is changed in comparing patterns of the sound field information for each frequency.

12. The security surveillance method of claim 10, wherein a fire situation is discriminated from an intrusion situation by analyzing whether a variation value of sound field in contrast to deviation from a reference sound field for a predetermined period is continuously increased or irregularly changed in the occurrence of the security situation.

13. The security surveillance method of claim 10, the multi-tone wave is generated as a continuous wave or a pulse type in an audible frequency of 20 to 20k Hz and an ultrasonic region of 20 kHz or higher.

14. The security surveillance method of claim 10, wherein the discrimination of the fire situation from the intrusion situation is performed by interworking with one or more sensors selected from among a passive infrared (IR) sensor, an IR sensor, an ultrasonic sensor, a sound detecting sensor, a vibration detecting sensor, a microwave sensor, a temperature sensor, a smoke sensor, a gas sensor, and a flame detecting type fire detecting sensor.

15. The security surveillance method of claim 10, further comprising storing image information and performing image capturing for verifying a situation in a case of occurrence of the fire or intrusion situation.

16. The security surveillance method of claim 10, wherein the security surveillance method interacts with a smart appliance including a vehicle blackbox, a security camera having a network function, an internet phone, a smart TV, a smart vehicle, a safe, or an interphone.

17. The security surveillance method of claim 16, wherein the interacting is implemented by installing software without addition of hardware to an interacting device in a time of interaction.

18. A security surveillance system comprising:
a sound generating device outputting a sound wave;
a sound receiving device obtaining sound field information for each frequency of a plurality of frequencies from a sound wave received from a security surveillance space;
a sound field signal processing device storing reference sound field information for each frequency by using the sound field output from the sound receiving device, comparing the reference sound field information with current sound field for each frequency output from the sound receiving device to determine occurrence of a security situation; and
an image obtaining unit obtaining an image of the security surveillance space in the occurrence of the security situation,
wherein the sound field signal processing device discriminates whether an occurring event is fire or intrusion by comparing and analyzing a pattern of the reference sound field information for each frequency with a pattern of sound field information for a frequency collected for a predetermined period in the occurrence of the security situation, and
wherein, after functionally shifting the pattern of the sound field information for each frequency for the predetermined period towards a high or low frequency, comparing the shifted pattern of the sound field information with the pattern of the reference sound field information, and analyzing frequency shift degrees, the sound field signal processing device determines whether fire occurs by detecting a variation speed of a continuous temperature increase by using the analyzed result, and determines an intrusion situation by detecting an aspect that a temperature change does not occur or irregularly occurs.

* * * * *